United States Patent [19]

Urui et al.

[11] Patent Number: 4,794,639

[45] Date of Patent: Dec. 27, 1988

[54] METHOD AND APPARATUS FOR AUTOMATICALLY TRANSMITTING A MESSAGE TO A TELEPHONE TERMINAL

[75] Inventors: Kiyoshi Urui; Hiroaki Yamashita, both of Yokohama, Japan

[73] Assignee: Kabushiki Kaisha Toshiba, Kanagawa, Japan

[21] Appl. No.: 834,415

[22] Filed: Feb. 28, 1986

[30] Foreign Application Priority Data

Mar. 4, 1985 [JP] Japan ............................. 60-42317

[51] Int. Cl.$^4$ ........................................... H04M 11/00
[52] U.S. Cl. ...................................... 379/89; 379/94; 379/96; 379/215
[58] Field of Search ..................... 379/88, 89, 93, 94, 379/96, 213, 214, 215, 70, 84; 370/62

[56] References Cited

U.S. PATENT DOCUMENTS 4,470,127  9/1984  Thompson .
4,654,483  3/1987  Imai et al. ........................ 379/93 X

FOREIGN PATENT DOCUMENTS 57852    8/1982  European Pat. Off. ............. 379/88
57853    8/1982  European Pat. Off. ............. 379/88
57854    8/1982  European Pat. Off. ............. 379/88
2169172  7/1986  United Kingdom ................. 379/94

OTHER PUBLICATIONS

C. Itoh, Communication Systems Inc., Elmsford, N.Y., Brochure entitled, "The Evolution of Office Communication, ESCOM, Executive/Secretary Communication System", received by PTO 5/87.

*Primary Examiner*—Keith E. George
*Attorney, Agent, or Firm*—Banner, Birch, McKie & Beckett

[57] ABSTRACT

A method and apparatus for automatically transmitting a message to a telephone terminal. Each message is assigned an identification code which identifies a message stored in a calling telephone. When the calling telephone calls the telephone which generated the identification code, the identified message is caused to be displayed to the calling party.

27 Claims, 21 Drawing Sheets

FIG. 14.

| | $c_0$ | $c_1$ | $c_2$ | $c_3$ | $c_4$ | $c_5$ | $c_6$ | $c_7$ | $c_8$ | $c_9$ | $c_{10}$ | $c_{11}$ |
|---|---|---|---|---|---|---|---|---|---|---|---|---|
| START OF PRESETTING (PRESET) MESSAGE | 1 | 0 | 1 | 0 | 0 | 0 | 0 | 0 | 0 | 0 | 1 | 1 |
| NO. OF MESSAGE IDENTIFIER | 1 | 1 | 1 | 0 | 0 | 0 | 0 | 1 | 0 | 1 | 1 | 1 |
| DATA OF CHANGEABLE PORTION OF MESSAGE | 1 | 0 | 0 | 0 | 0 | 0 | 0 | 0 | 0 | 0 | 0 | 1 |
| | 1 | 0 | 0 | 0 | 0 | 0 | 0 | 0 | 1 | 0 | 1 | 1 |
| | 1 | 0 | 0 | 0 | 0 | 0 | 0 | 0 | 0 | 0 | 0 | 1 |
| | 1 | 0 | 0 | 0 | 0 | 0 | 0 | 0 | 0 | 0 | 0 | 1 |
| END OF PRESETTING (PRESET) MESSAGE | 1 | 1 | 0 | 0 | 0 | 0 | 0 | 0 | 1 | 1 | 1 | 0 |

FIG. 18.

| | $c_0$ | $c_1$ | $c_2$ | $c_3$ | $c_4$ | $c_5$ | $c_6$ | $c_7$ | $c_8$ | $c_9$ | $c_{10}$ | $c_{11}$ |
|---|---|---|---|---|---|---|---|---|---|---|---|---|
| START OF REAL TIME MESSAGE | 1 | 0 | 1 | 1 | 0 | 0 | 0 | 0 | 0 | 0 | 0 | 1 |
| NO. OF MESSAGE IDENTIFIER | 1 | 1 | 1 | 1 | 0 | 0 | 0 | 1 | 1 | 0 | 1 | 1 |
| END OF REAL TIME MESSAGE | 1 | 0 | 1 | 1 | 0 | 0 | 0 | 0 | 0 | 0 | 0 | 0 |

| PORT No. | CUSTOMER DATA | | | | MESSAGE BEING SET | |
|---|---|---|---|---|---|---|
| | TYPE | TEL NO. | ------- | STATUS | IDENTIFIER | CHANGEABLE DATA |
| 0 | | | | | | |
| 1 | | | | | | |
| 2 | | | | | | |
| 3 | | | | | | |
| i | WITH DISPLAY | 2621 | | 7 | 5 | 0  300 |
| j | | | | | | |
| n | | | | | | |

| $c_0$ | $c_1$ | $c_2$ | $c_3$ | $c_4$ | $c_5$ | $c_6$ | $c_7$ | $c_8$ | $c_9$ | $c_{10}$ | $c_{11}$ | |
|---|---|---|---|---|---|---|---|---|---|---|---|---|
| 1 | 0 | 1 | 0 | 0 | 0 | 0 | 0 | 1 | 0 | 0 | 1 | START OF COPYING MESSAGE |
| 1 | 1 | 1 | 0 | 0 | 0 | 0 | 0 | 0 | 0 | 1 | 0 | No. OF MESSAGE IDENTIFIER |
| 1 | 0 | 0 | | | | | | | | | | |
| 1 | 0 | 0 | | | | | | | | | | UNCHANGEABLE PORTION OF MESSAGE |
| 1 | 0 | 0 | | | (CHARACTER CODE) | | | | | | | |
| 1 | 0 | 0 | | | | | | | | | | |
| 1 | 0 | 0 | | | | | | | | | | |
| 1 | 1 | 1 | 0 | 0 | 0 | 0 | 0 | 0 | 1 | 0 | 0 | No. OF MESSAGE IDENTIFIER |
| 1 | 0 | 0 | | | | | | | | | | UNCHANGEABLE PORTION OF MESSAGE |
| 1 | 0 | 0 | | | (CHARACTER CODE) | | | | | | | |
| 1 | 0 | 1 | 0 | 0 | 0 | 0 | 0 | 1 | 0 | 1 | 0 | END OF COPYING MESSAGE |

*FIG. 20.*

| | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | |
|---|---|---|---|---|---|---|---|---|---|---|---|---|---|---|
| | 1 | 1 | 0 | 0 | 0 | 0 | 0 | 0 | 0 | 0 | 0 | 1 | 1 | INQUIRY |
| | 1 | 1 | 0 | 0 | 0 | 0 | 0 | 0 | 0 | 0 | 1 | 1 | 0 | RESPONSE |

METHOD AND APPARATUS FOR AUTOMATICALLY TRANSMITTING A MESSAGE TO A TELEPHONE TERMINAL

BACKGROUND OF THE INVENTION

The present invention generally relates to the field of telecommunications and more particularly, is directed to a method and apparatus for automatically transmitting a message to a telephone terminal.

Over the last several years, there has been a marked increase in the level of sophistication and complexity of electronic telephone exchange systems. In addition, telephone sets have been developed which are far superior in terms of capability to those previously known in the art. Such functions are touch-tone and multi-function telephone sets are not commonplace and are continuing to be improved. Present day telephone sets and electronic exchange systems represent a substantial improvement over such devices known in the prior art. There is still a need, however, for further improvement. For example, it is not possible to make a telephone call to a telephone set which is presently being used. The calling party merely receives a busy signal alerting him that the telephone set which he is trying to reach is presently in use. In matters of great urgency, it is necessary to be able to communicate with a telephone set even though it may be in use. Moreover, in routine situations, it is often convenient to pass a message to the user of a telephone set such that the user may receive important information timely. In telephone sets known in the prior art, such a feature is not available.

Present-day telephone sets are further deficient in that they provide no means of communicating to a calling party that the person he wishes to reach is out of the office or away from his telephone for an extended period of time. Of course such devices as automatic telephone answering machines are available. However, such machines are rather expensive and are prone to the user forgetting to turn them on prior to leaving his office or home. Accordingly, there is a need in the art to provide a telephone set which can automatically inform the calling party that the person whom he wishes to reach is not presently available. Moreover, such telephone sets should have the capability of ease of use while at the same time providing the user with substantial flexibility in programming messages for automatic transmission to a calling party. As mentioned above, automatic answering machines are presently available and do provide a useful service. Such service, however, is limited for the above-mentioned reasons and also for the reason that they usually cannot be set up to provide more than one or two messages for playback to a calling party. Usually, such messages cannot readily be changed, thereby, causing the telephone user to always rely on a somewhat general and nonspecific message. Such messages usually provide little, if any, accurate information as to the present whereabouts or expected time of return of the user.

Though voice store and forward systems are known in the art, such systems are rather complicated and expensive to implement. These systems usually include a voice signal memory which records the voice of the calling party for playback to the person being called at some predetermined time. The deficiencies in such a system are apparent. For example, there is usually no way to know the ideal time which the recorded voice signal should be played back to the called party. Moreover, the amount of memory required to store voice signals is substantial, thereby greatly reducing the number of messages that can be stored in any given system.

Accordingly, there is a great need in the art for a system which can be used to efficiently, rapidly and reliably transmit a message to a telephone when the telephone is in use or when the telephone cannot be answered.

SUMMARY OF THE INVENTION

It is, therefore, the overall object of the present invention to provide a telephone message communications system which is far superior to such systems known in the prior art.

It is another object of the present invention to provide a telephone message communication system for use in conjunction with a telephone exchange which performs conventional exchange functions.

It is another object of the present invention to provide a telephone message system for use with a telephone exchange which permits a plurality of messages of different types to be automatically transmitted to a called or calling telephone.

It is a still further object of the present invention to provide a telephone message system which permits a message to be transmitted to a telephone even though the telephone is in use.

It is a still further object of the present invention to provide a telephone message system which automatically responds to a calling telephone with information concerning the status of the telephone being called.

These and other objects of the present invention are achieved by providing a telephone message system wherein each telephone includes a central processing unit and a plurality of input keys which may be actuated to access one or more stored messages in the telephone. Each message may include a fixed part and a changeable part. One example of such a message is "Out of office till __:__." The changeable portion of the message is represented by dashes and would by the time of day, as for example, "03:00". Thus, when the particular telephone having such a message is called, the message is automatically transmitted to the calling telephone for display on the calling telephone. Thus, the caller would know immediately that the person whom he is trying to reach will be out of the office until 3:00 o'clock. Such a feature avoids the problem of the calling party having to leave a message and the attendant problem of the message not being communicated to the person being called. In the system of the present invention, the calling party will know that he should call back at 3:00 o'clock. Thus, the likelihood that the calling party will reach the intended party is greatly increased.

In accordance with the present invention, when a telephone user wishes to preset a message for automatic transmission to a calling party, he selects the message from a plurality of messages and then transmits to the central exchange an identification code which identifies the selected message. The identification code is stored in the exhange. In addition, if the message includes a changeable part, the changeable data is also sent to the exchange and stored along with the identification code. When the exchange receives a call which is destined for the telephone from which the identification code came, the call is intercepted and the exchange automatically transmits the identification code and any changeable information to the calling telephone. The calling telephone has a corresponding table of messages, one of which matches the identification code. The identified message is then automatically displayed on the calling telephone.

In another embodiment of the present invention, a message may be transmitted from one telephone to another telephone even though the destination telephone is presently busy. Such a feature is of great convenience and insures that a telephone user will always receive important messages timely.

BRIEF DESCRIPTION OF THE DRAWINGS

FIG. 14 is an illustration of the data format used when the telephone terminal shown in FIG. 6 is in a preset message mode.

FIG. 18 is an illustration of the data format used when the telephone terminal shown in FIG. 6 is in the real time message mode.

FIG. 20 is an illustration of the format of the signal used to send message related data from the exchange shown in FIG. 1 to a telephone terminal.

DETAILED DESCRIPTION OF THE PREFERRED EMBODIMENTS

A preferred embodiment of the telephone message communication system in accordance with the present invention will be described below with reference to the annexed drawings.

Figure 1:
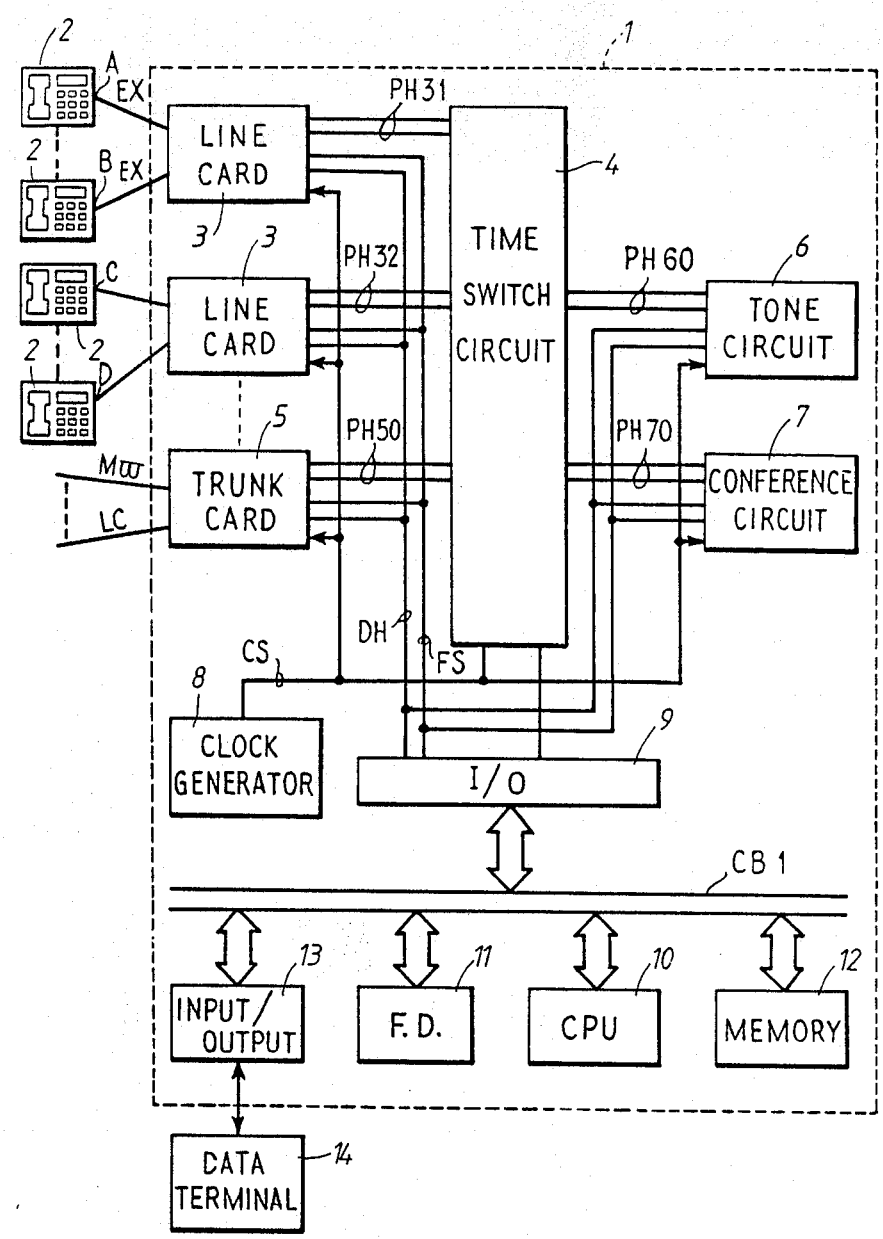
FIG. 1 is a block diagram of a telephone message communication system in accordance with the present invention.

With reference to FIG. 1, one embodiment of the present invention comprises exchange 1 and a plurality of telephone terminals 2, each having a visual display. Each of telephone terminals 2 may be used to communicate with any other terminals connected to exchange 1.

As shown in FIG. 1, exchange 1 includes a plurality of line card 3 through which telephone terminals 2 are connected to exchange 1. As will be described below, line card 3 and telephone terminal 2 are connected to each other by a 2-line bi-directional bus using a burst transfer technique. A plurality of telephone terminals 2 may be connected to a common line card 3 as shown in FIG. 1.

Pulse coded modulation (PCM) buses PH 31 and PH 32 connect line card 3 to time switch circuit 4. Trunk card 5, tone circuit 6 and conference circuit 7 are also connected to switch circuit 4 by PCM buses PH50, PH60 and PH70, respectively. Each PCM buss carries PCM audio signals and data signals. Time switch circuit 4 is adapted for multiplexing the signals on PCM busses PH31, PH32, PH50, PH60 and PH70.

Trunk card 5 has wires MW and leased circuit wires LC connected to it. These wires are used to connect exchange 1 to other remote exchanges. Tone circuit 6 is adapted to generate various tones, such as busy signal and a dial tone for transmission to telephone terminal 2 and main wires MW. These tones are supplied as digital signals from circuit 6. Conference circuit 7 provides telephone conference call capability to telephone terminals 2.

The operations of line card 3, time switch circuit 4, trunk card 5, tone circuit 6 and conference circuit 7 are based on reference clocks supplied from clock generator 8. Line card 3, trunk card 5, one circuit 6 and conference circuit 7 are also connected to I/O interface 9 by data buss DH and PCM frame signal line FS. CPU 10, floppy disk 11, memory 12 and input/output circuit 13 are connected to I/O interface 9 by buss CB1. Floppy disk 11 stores various data, as well as an operating system program which is executed by CPU 10 to control exchange 1. The data and operating system stored in floppy disk 11 may be loaded into memory 12 when exchange 1 is first activated.

Data terminal 14 is connected to input/output circuit 13 and is used mainly to input system data and for system maintenance. System data includes such data as the design and capability of telephone terminal 2 where terminal 2 is a multi-function terminal, the various functions assigned to each telephone function key on terminal 2 and other information specific to respective telephone terminals. Data terminal 14 may also be used to enter messages in accordance with the present invention.

Figure 2:
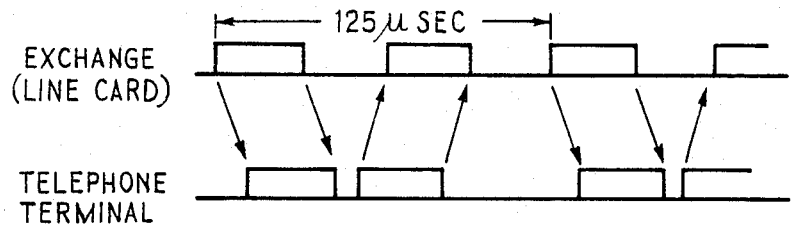
FIG. 2 is an illustration of a 2-line bi-directional burst transfer method of transmitting information.

As stated above, line card 3 and telephone terminal 2 are interconnected by a 2-line bi-directional buss. Data signals are exchanged using a bust transfer technique similar in operation to a ping-pong ball being hit back and forth across a ping-pong table. As shown in FIG. 2, signals of a predetermined format are transmitted in a burst manner from line card 3 to telephone terminal 2. In return, signals of a predetermined format are transferred to a burst manner from telephone terminal 2 to line card 3. This signal exchange is usually conducted within 125 micro seconds.

Figure 3:
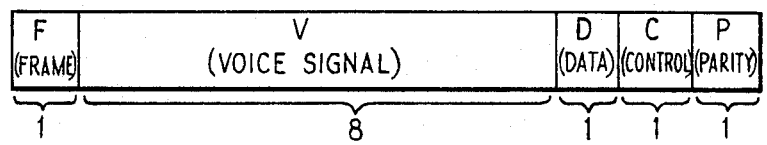
FIG. 3 is an illustration of the signal format used in the burst transfer method shown in FIG. 2.

The signal format used for the signals shown in FIG. 2 consists of a plurality of frames; each having 12 digital bits as shown in FIG. 3. The leading bit F is a frame synchronization bit. The next 8 bits V are alloted for digitized audio signals. Bit D is a data bit which is followed by a control bit C and a parity bit P. Since each frame can be transmitted within 125 micro-seconds, bits V, which contain a digitized audio signal, has a transfer rate of 64 kbps.

Figure 4:
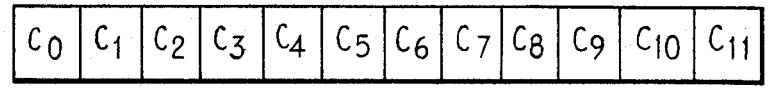
FIG. 4 is an illustration of a multi-bit control signal used in the present invention.

Data bit D is used to transfer data between a data terminal connected to line card 3. When there is no need for a digitized audio transer, audio bits V can also be used as data bits D. Control bit C is provided for the purpose of controlling telephone terminal 2. A complete control signal is comprised of 12 bits as shown in FIG. 4. Thus, a control signal is formed by accumulating 12 control bits C from 12 successive frames having the format shown in FIG. 3. Parity bit P serves as a parity check.

As discussed above, signal transfers between telephone terminal 2 and line card 3 are via a 2-line bi-directional buss using a burst transfer technique. Each signal is di-phase encoded where a signal level change is synchronized with a reference clock. In response to a logic "1" signal, the level of the di-phase signal remains constant during the same clock period. However, in response to a logic "0" signal, the level of the di-phase signal may change within the same clock period. FIGS. 5a and 5b show practical examples of NRZ and di-phase (DP) signal trains. Such signals will be discussed further below.

Figure 6:
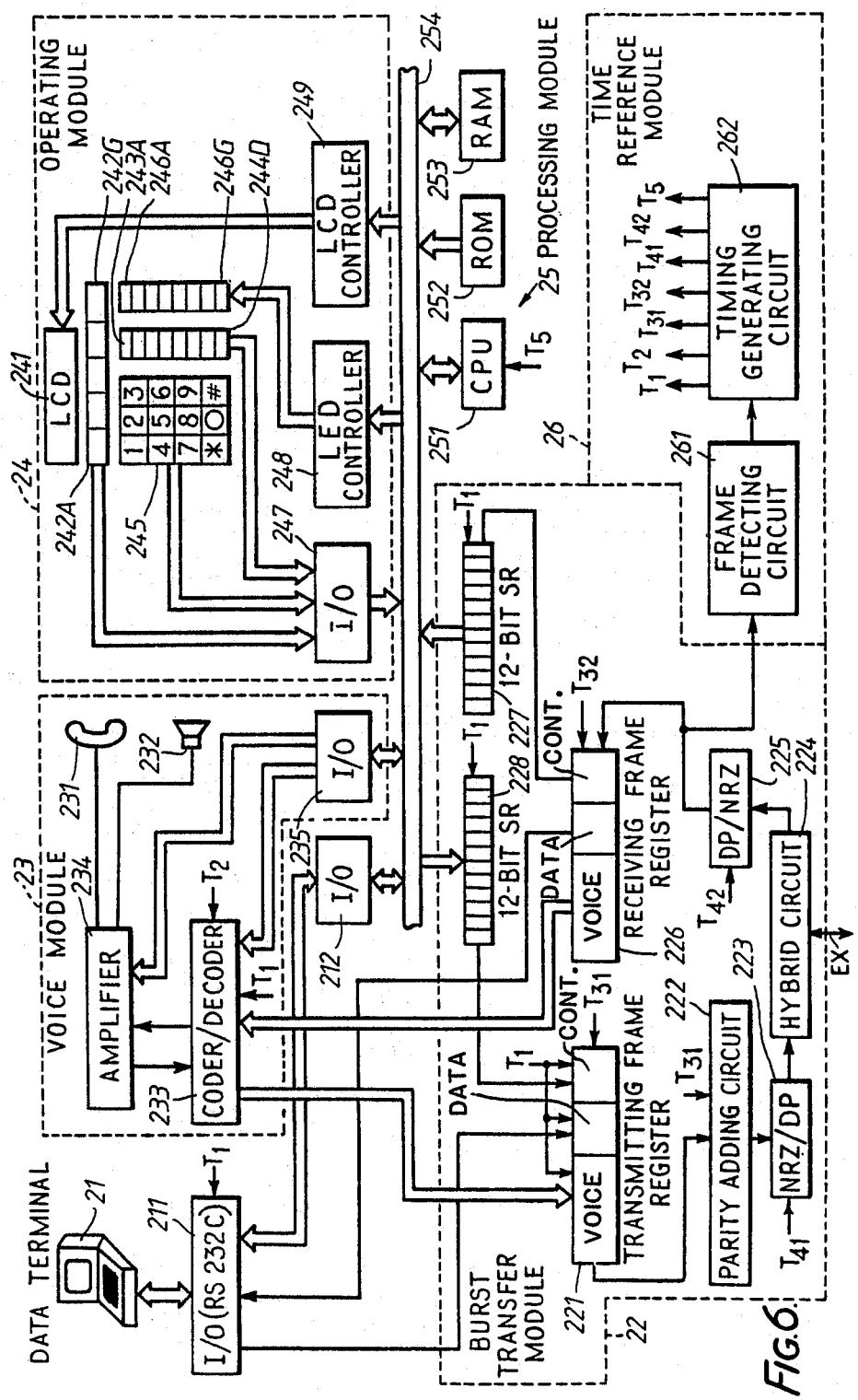
FIG. 6 is a block diagram of one embodiment of a telephone terminal for use with the telephone message communication system shown in FIG. 1.

With reference to FIG. 6, the construction of telephone terminal 2 will be explained. For purposes of explanation only, it is assumed that data terminal 21 is connected to telephone terminal 2. Telephone terminal 2 includes burst transfer module 22, voice module 23, operating module 24, processing module 25 and time reference module 26.

Burst transfer module 22 includes transmitting frame register 221, parity adding circuit 22, NRZ/DP converter 22, hybrid circuit 224, DP/NRZ converter 225, receiving frame register 226 and two 12-bit shift registers 227 and 228. Burst transfer module 22 is adapted to exchange signals with exchange 1 shown in FIG. 1 and to exchange digital data with voice module 23. Burst transfer module 22 also exchanges digital data with processing module 25 and data terminal 21.

Voice module 23 includes handset 231, speaker 232, coder/decoder 233, amplifier 234 and I/O 235. Voice module 23 converts a digitized audio signal to an anologue voice signal and viceversa. Operating module 24 includes liquid crystal display (LCD) 241, soft keys 242A-242G, function keys 243A, 244D, dial pad 245, light emitting diodes (LEDs) 246A-246G, I/O 247, LED controler 248 and LCD controler 249. Operating module 24 provides an electronic interface between uses of telephone terminal 2 and processing module 25. Processing module 25 includes CPU 251, ROM 252, RAM 253 and common buss 254. Voice module 23, operating module 24 and burst transfer module 22 are also coupled to CPU 251 via buss 254. Processing module 25 is also adapted to control the operation of the above described modules within terminal 2. As also shown in FIGS. 6, time reference module 26 includes frame detecting circuit 261 and timing generating circuit 262.

Voice module 23 is adapted to convert the PCM voice data received in digitized form from burst transfer module 22 into analogue voice signals by means of coder/decoder 233 in response to a timing signal $T_2$ from time reference module 26. The resulting analogue voice signals are transferred through amplifier 234 to handset 231 or to speaker 232 as audible sound. Coder/decoder 233 is a PCM coder/decoder having both coding and decoding functions. Control of coder/decoder 233 and amplifier 234 by CPU 251 is conducted through common buss 254 and I/O 235.

The incoming analogue voice signals from handset 231 is delivered through amplifier 234 to encoder/decoder 233. The analogue signals are converted to digital form in encoder/decoder 233 and are then provided to transmitting frame register 221 of burst transfer module 22. Transmitting frame register 221 has a portion V for the digitized voice signal, a portion D for the data signal and a portion C for the control signal. The output of coder/decoder 233 is provided to voice portion V, the output of data terminal 21 is provided to data portion D through I/O 211 and the output of shift register 228 is provided to control signal portion C. The output from transmitting frame register 221 is provided to parity bit adding circuit 222, the output of which is sent to NRZ/DP converter 223 and is then delivered to hybrid circuit 224 for transmission to exchange 1 shown in FIG. 1. The above described elements constitute the transmitting portion of burst transfer module 22.

In the receiving portion of burst transfer module 22 incoming signals from exchange 1 are coupled to hybrid circuit 224. The output from hybrid circuit 224 is supplied to DP/NRZ converter 225. The signals are supplied from exchange 1 to DP/NRZ converter 225 as a succession of frames in accordance with the format shown in FIG. 3. The ouptut from DP/NRZ converter 225 is supplied to receiving frame register 226. As in transmitting frame register 221, receiving frame register 226 has a portion V for the voice signal, a portion D for the data signal and a portion C for the control signal. These portions comprise eight digital bits, a first single digital bit and a second single digital bit, respectively, the frame bit and parity bit having been removed from each frame.

The data in voice portion V in receiving frame register 226 constitutes an input for coder/decoder 233. Similarly, the data in data portion D is supplied to data terminal 21 through I/O 211, an RS 232C port. The data in control portion C is supplied to 12-bit shift register 227.

Transmitting frame register 221 operates in the following manner. An 8-bit PCM digital voice signal from coder/decoder 233 is temporarily stored in voice signal portion V of transmitting frame register 221. CPU 251 transmits over common buss 254 control data consisting of a plurality of 12-bit units. This control data is temporarily stored in control signal portion C of 12-bit shift register 228. Shift register 228 supplies the data in a bit-by-bit fashion to control signal portion C of transmitting frame register 221. Each bit of the control data is transmitted from 12-bit shift register 228 once every 125 micro seconds. This rate is controlled by timing signal $T_1$ from time reference module 26. As mentioned above, the data from data terminal 21 is stored in data portion D of transmitting frame register 221 through I/O 211. The transmission of data from I/O 211 is also controlled by a timing signal $T_1$.

After preparation of the 10 bits of data in transmitting frame register 221 as described above, the data is sent to parity adding circuit 222 in accordance with timing signal $T_{31}$ from time reference module 26 where frame synchronizing bit F and parity bit P are added to the data bits. This format is the same as that shown in FIG. 3. The data is ouptut from transmitting frame register 221 with a 100% duty cycle ratio and has the same form as a Non-Return-To-Zero (NRZ) signal. This NRZ signal is subjected to di-phase coding by NRZ/DP converter 223. Thereafter the signal is sent to hybrid circuit 224 for transmission to exchage 1.

In the signal receiving mode, the di-phase coded signal from exchange 1 is received by hybrid circuit 224 and is converted into an NRZ signal train by DP/NRZ converter 225. As described above, the incoming signal is formed of 12 digital bits in accordance with the format shown in FIG. 3. The data in the second to ninth bits from the starting end are stored in voice portion V of receiving frame register 226. The data in the tenth and eleventh bits are stored in data portion D and control signal portion C, respectively.

The data in voice signal portion V is supplied to coder/decoder 233 and is converted into an audible sound as afore described. The data in data portion D is transferred to data terminal 21 through I/O 211. The data in control signal portion C is sent to 12-bit shift register 227 and after 12 control signal bits are accumulated, the complete control data signal is transmitted to CPU 251 through common buss 254.

The key input information from dial pad 245, soft keys 242A–242G, function keys 243A–244D of operating module 24 are transmitted to CPU 251 through common buss 254. Upon rceipt of the information associated with function keys 243A–244D, CPU 251 executes a program stored in ROM 252 to control LED controller 248 which activates selected LEDs from among LEDs 246A–246G.

Figure 7:
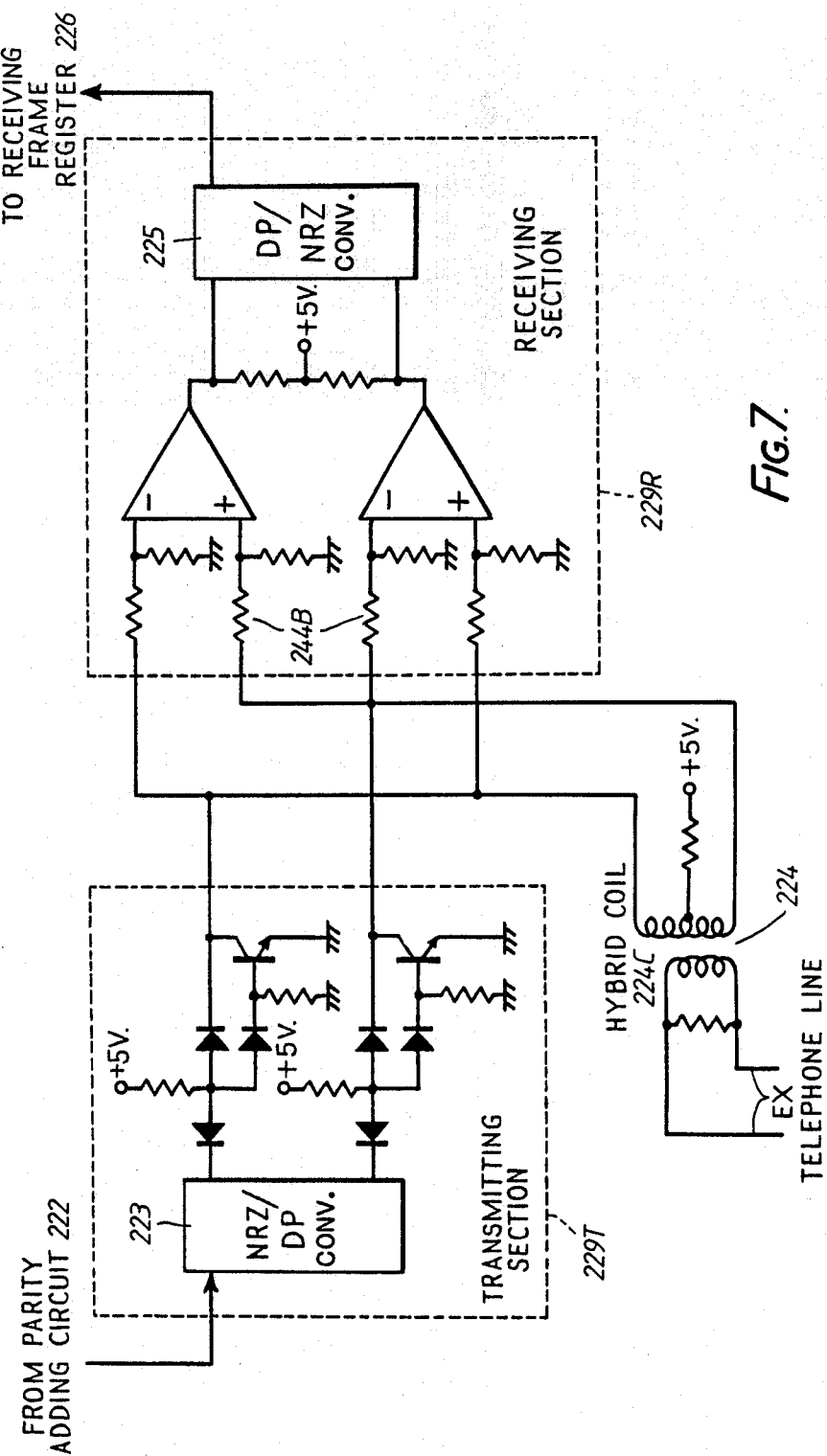
FIG. 7 is a circuit diagram of hybrid circuit 224 shown in FIG. 6.

With reference to FIG. 7, the operation of NRZ/DP converter 223, hybrid circuit 224 and DP/NRZ converter 225, will be described. Converters 223 and 224 are electrically connected to exchange 1 shown in FIG. 1 through hybrid coil 244C. The converters are respectively comprised of a transmitting section 229T which includes NRZ/DP converter 223 and a receiving section 229R which includes DP/NRZ converter 225. In this arrangement, the signal from exchange 1 is received as di-phase coded digital data in the format shown in FIG. 3. The signal is then supplied to DP/NRZ converter 225 through operational amplifier circuits 224B for conversion to a NRZ coded signal. The NRZ signal is supplied to frame register 226 as above described. On the other hand, digital data signals of the format shown in FIG. 3 for transmission to exchange 1 are supplied to NRZ/DP converter 223 for conversion from NRZ coding to di-phase coding. The di-phase coded signals are then transmitted to exchange 1 via hybrid coil 224C.

The operation of time reference module 26 shown in FIG. 6 will now be described. In this embodiment of the invention, timing signals for the operation of the telephone terminal are derived from time reference module 26. More specifically, the frame synchronization bit is detected from the signal received by frame detecting circuit 261. The various timing signals are generated in synchronism with the time of detection. Timing signals $T_1$–$T_5$ are generated in accordance with the clock signals from a clock generator (not shown) in timing generating circuit 262. Timing signals $T_1$, $T_2$, $T_{31}$, $T_{32}$, $T_{41}$, $T_{42}$, and $T_5$ are clock signals having frequencies of 8 kHz, 64 kHz, 256 kHz, 512 kHz and 2 MHz, respectively. Timing signals $T_{31}$ and $T_{41}$ are generated only during the period of a burst transmission and timing signals $T_{32}$ and $T_{42}$ are generated only during the period of a burst reception.

Figure 8:
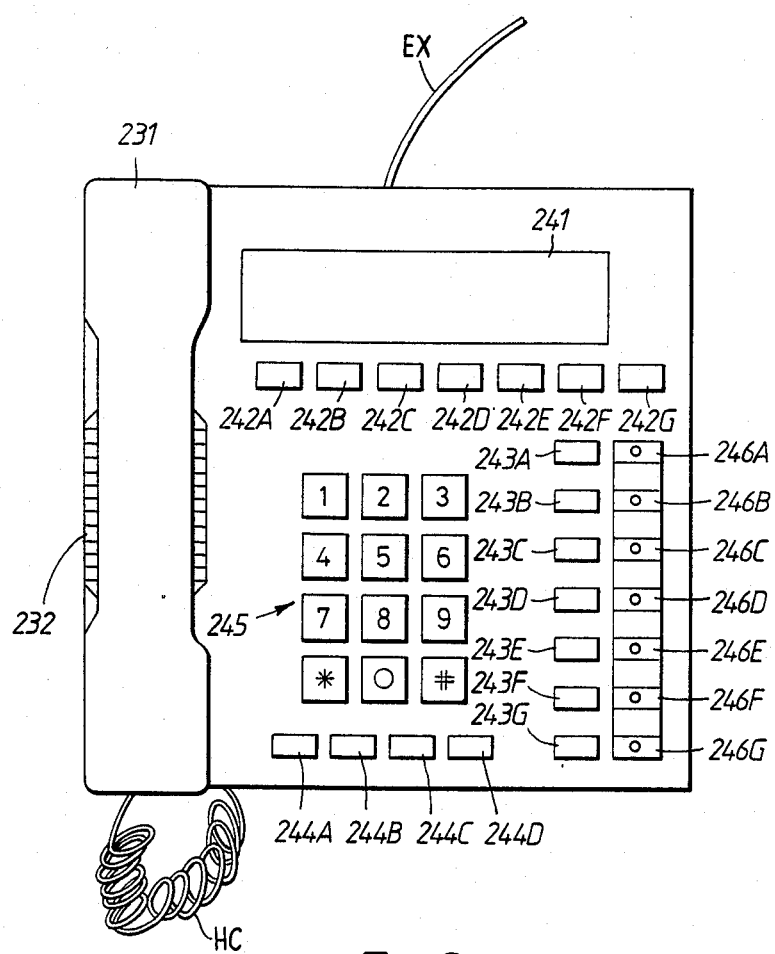
FIG. 8 is a top view of the telephone terminal illustrated in FIG. 6.

As can be seen from FIG. 8, and as explained above, the telephone terminal includes LCD 241 and soft keys 242A–242G which are located adjacent LCD 241. The function of soft keys 242A–242G are assigned in accordance with the operating state of the telephone terminal. The display area of LCD 241 is divided into a plurality of display portions each of which displays a respective function assigned to the soft keys.

A first set of function keys 243A–243G are provided along with soft keys 242A–242G. Various functions may be assigned to function keys 243A–243G and LEDs 246A–246G are provided to indicate the status of these functions keys. A second set of function keys 244A–244D are also provided in addition to function keys 243A–243G. Fixed functions, such as auto-dialing and automatic re-dialing are preassigned to the function keys.

Dial pad 102 is provided on the upper central portion of the housing of the telephone terminal. A speaker 232 and handset 231 are provided on the left side of the housing. Handset 232 is connected to the inner circuitry of the telephone terminal through handset cord HC. The telephone terminal is connected to exchange 1 (line card 3) shown in FIG. 1 through line EX.

Figure 9:
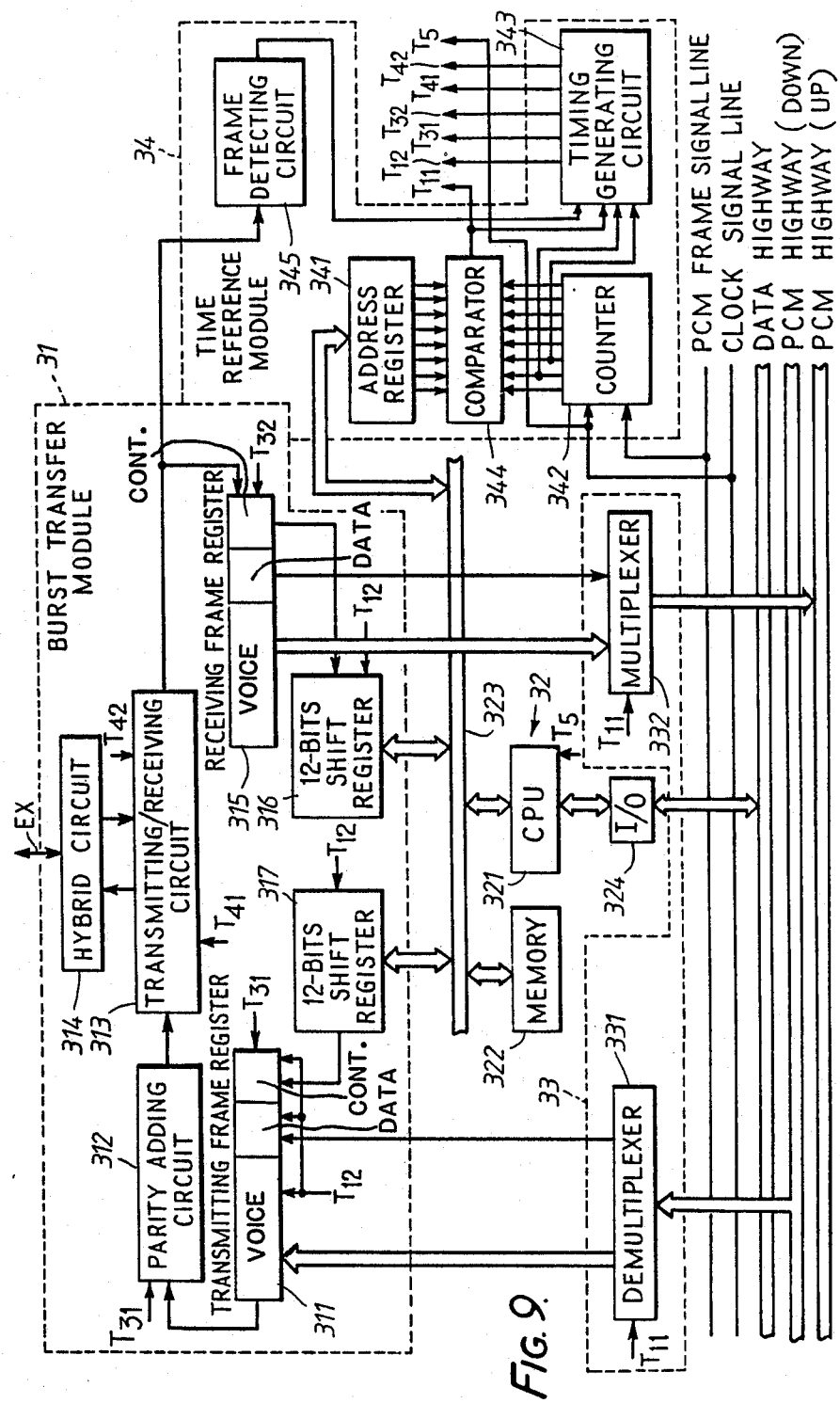
FIG. 9 is a block diagram of line card 3 shown in FIG. 1.
Figure 10A:
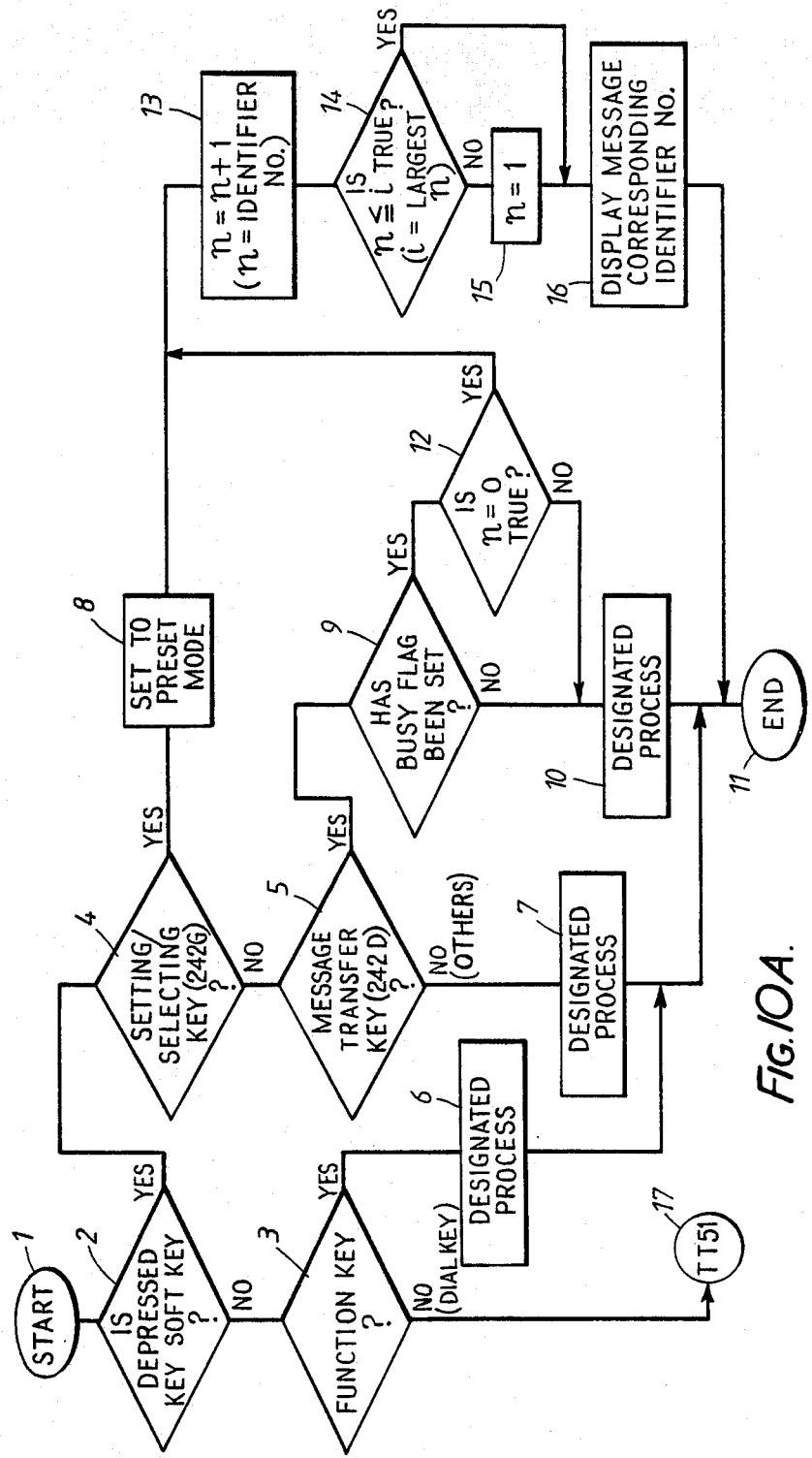
FIGS. 10a and 10b are flow charts illustrating the operation of CPU 251 in the telephone terminal shown in FIG. 6 when a key on the terminal is activated.
Figure 10B:
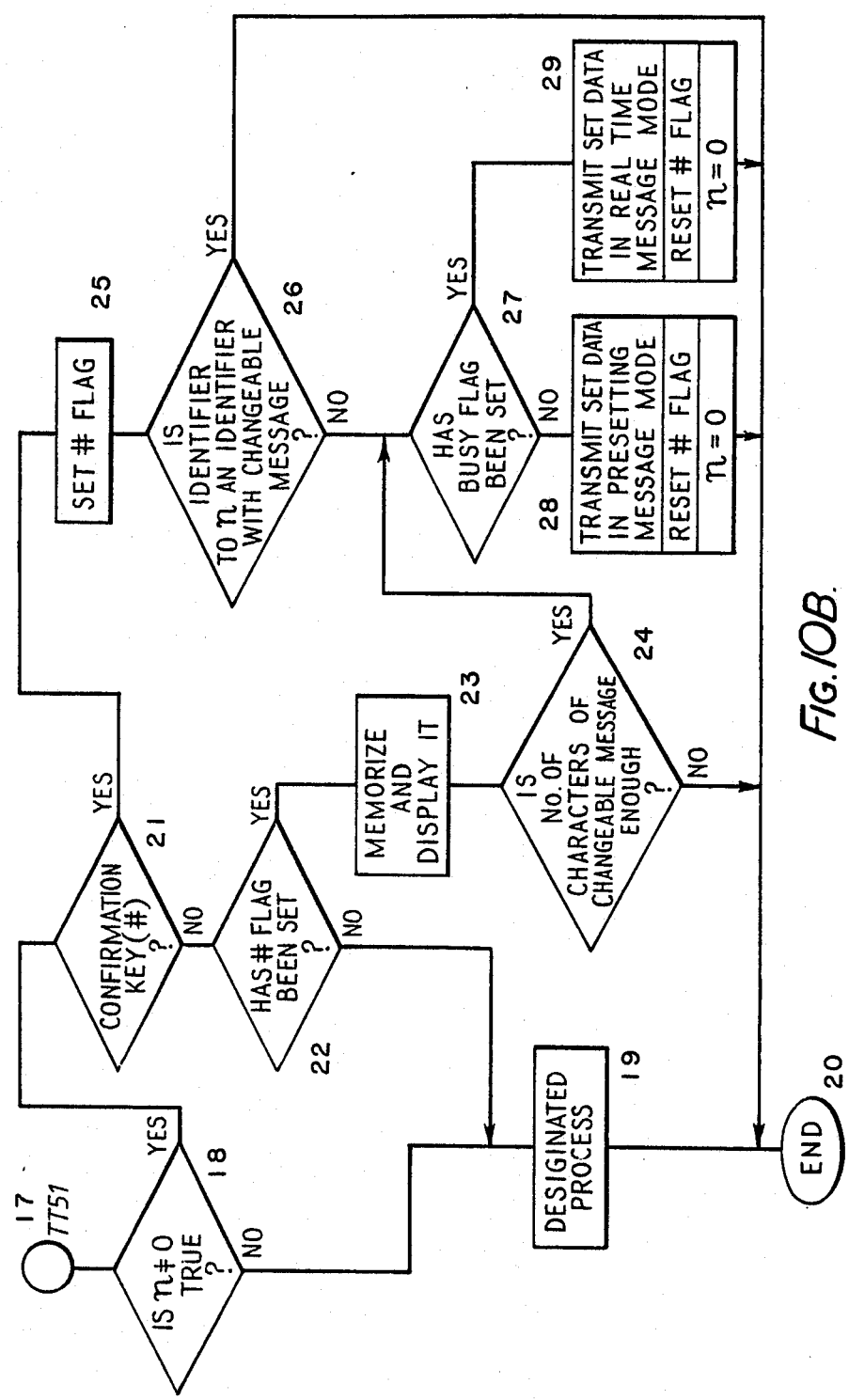
Figure 11:
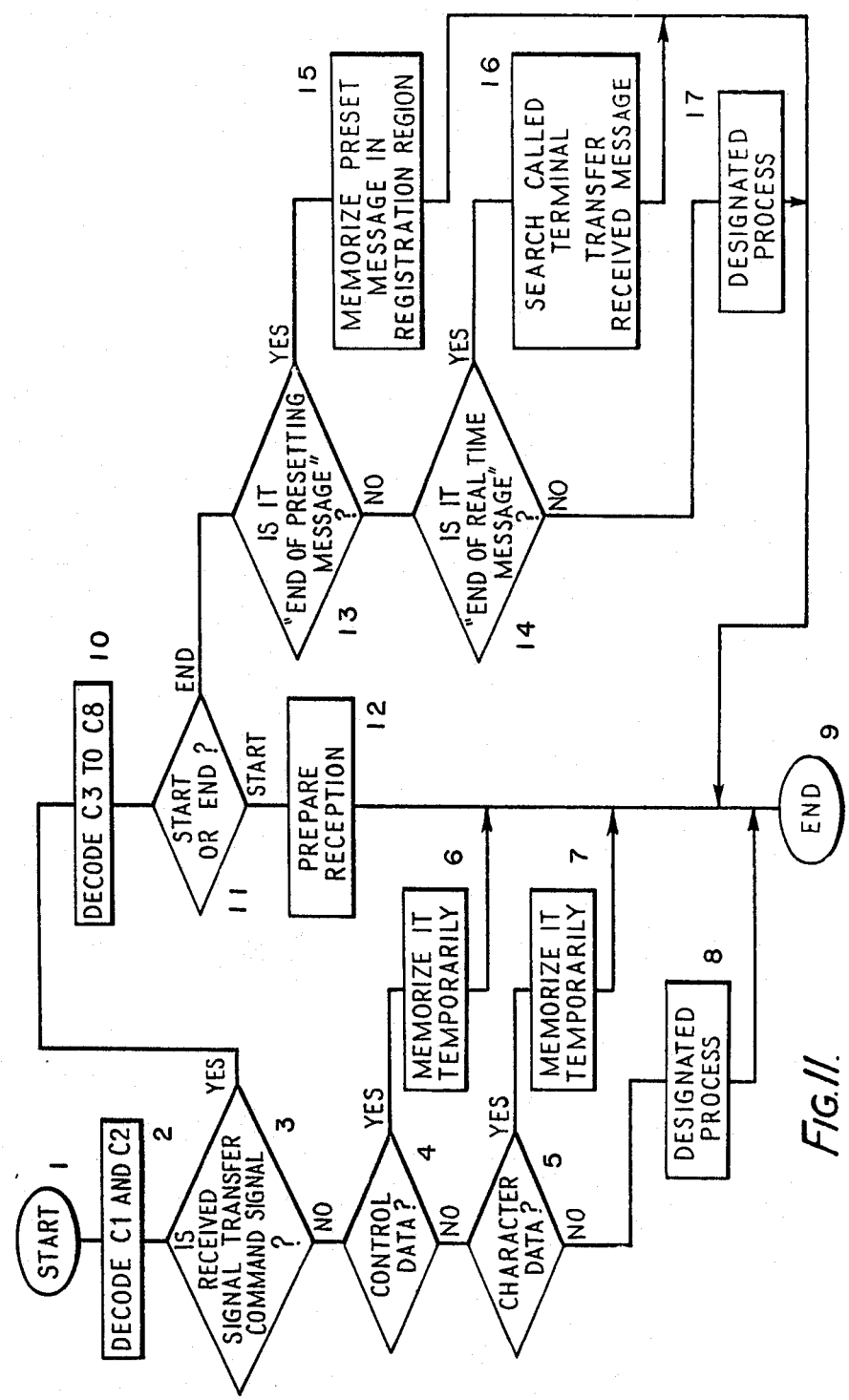
FIG. 11 is a flow chart illustrating the operation of CPU 10 in the telephone message communication system shown in FIG. 1 when an incoming signal is received.

The operation of line card 3 shown in FIG. 1 will be described with reference to FIG. 9. Line card 3 includes burst transfer module 31, processing module 32, interface module 33 and time reference module 34. A separate burst transfer module 31, interface module 33 and time reference module 34 is provided for each telephone terminal which is connected to line card 3.

Burst transfer module 31 includes transmitting frame register 311, parity adding circuit 312, transmitting/receiving circuit 313, hybrid circuit 314, receiving frame register 315 and two 12-bit shift registers 316 and 317. Processing module 32 includes CPU 321, memory 322 having ROM and RAM, common buss 323 and I/O 324. Interface module 33 includes demultiplexer 331 and multiplexer 332. Time controlling module 34 includes address register 341, counter 342, time generating circuit 343, comparater 344 and frame detecting circuit 345.

Hybrid circuit 314 and transmitting/receiving circitt 313 in burst transfer module 31 have the same constructions and operate in the same manner as the corresponding circuits shown in FIG. 7. Thus, these circuits are adapted for receiving signals from exchange 1, converting the received signal into NRZ signals and converting the NRZ signals into di-phase (DP) signals for transmission to exchange 1.

In the receiving portion of transmitting/receiving circuit 313, incoming signals from exchange 1, after conversion to NRZ signals, are provided to receiving frame register 315 in accordance with timing signal $T_{32}$ from reference module 34. At this time, the data in the second to ninth bits as counted from frame synchronization bit F are stored in voice signal portion V. The data in the tenth bit is stored in data portion D while the data on the eleventh bit is stored in control signal portion C. Multiplexer 332 delivers the contents of voice signal portion V and data portion D to the PCM buss in accordance with timing signal $T_{11}$ from time reference module 34. The PCM buss is connected to the switch circuit 4 shown in FIG. 1 as aforedescribed. The control signal stored in control signal portion V of receiving frame register 315 is accummulated in 12-bit shift register 316 bit by bit every time timing signal $T_{12}$ is applied. The 12 bits thus accummulated forms a control signal which is then transferred to CPU 321 through buss 323. CPU 321 reads this signal through a predetermined process in accordance with the contents of memory 322 and delivers the same to the data through I/O 324 as required. The data delivered to the data buss is sent to CPU 10 in exchange 1 where it is processed in a predetermined manner.

The transfer of signals from the telephone terminal to exchange 1 via line card 3 is conducted in the manner described above. The transfer of signals from exchange 1 to the telephone terminal is conducted in the following manner. PCM voice data and data for data terminal 21 shown in FIG. 6 are transferred through the PCM buss and are received by demultiplexer 331 of line card 3 in accordance with timing signal $T_{11}$ from time reference module 34.

The data transferred through the data buss is the data which is necessary for the control of exchange 1 and is distinguished from the data transferred through the PCM buss mentioned before. The data transferred through the data buss is sent to CPU 321 through I/O 324 and is accumulated in 12-bit shift register 317.

The contents of demultiplexer 331 and 12-bit shift register 317 are transferred to transmitting frame register 311 in accordance with timing signal $T_{12}$ from time reference module 34. As in the cases of receiving frame register 315 and receiving frame register 226 of the telephone terminal shown in FIG. 6, transmitting frame register 311 is divided into three portions V,D and C and stores corresponding data from demultiplexer 331 and 12-bit shift register 317. The contents of transmitting frame register 311 is transmitted parity adding circuit 312 in accordance with a timing signal from time reference module $T_{31}$. Frame synchronizing bit F and parity bit P are then added to this data. The data is then transmitted to transmitting/receiving circuit 313. In transmitting/receiving circuit 313, the data is di-phase coded and the delivered to exchange 1 through hybrid circuit 314.

Time reference module 34 generates a plurality of timing signals. A predetermined count value is stored in address register 341 by CPU 10 within exchange 1 via common buss CB1 and CPU 321. This count value corresponds to preassigned transmission time slots and reception time slots for each port of line card 3 and each port of trunk card 4. Line card 3 and trunk card 4, each of which has a plurality of ports, are commonly connected to the PCM buss and have 256 time slots, for example. Counter 342 is an 8-stage (250 step) counter to which a reference clock and PCM frame synchronization signal are provided. Counter 342 counts the reference clock (e.g., operating at a frequency of 2,048 MHz) and is cleared by the PCM frame synchronization signal (e.g., operating at a frequency of 8 kHz). Outputs of all stages of counter 342 are supplied to comparator 344 along with the contents of register 341. Comparator 344 compares the contents of counter 342 to those of register 341 and generates an accordance signal when the contents are the same. This accordance signal is output as timing signal $T_{11}$ and is supplied to timing generating circuit 343. The reference clock signal is provided as timing signal $T_5$. The other two outputs signals from counter 342 have frequencies of, e.g., 512 kHz and 256 kHz and are supplied to time generating circuit 343. A frame signal detected by frame detecting circuit 345 is also supplied to time generating circuit 343. Time generating circuit 343 generates timing signal $T_{12}$ which corresponds to timing signal $T_{11}$ but is delayed by a short time, for example one time slot length of the PCM buss. Time generating circuit 343 further generates timing signals $T_{31}$ and $T_{41}$ having frequencies of, e.g., 256 kHz and 512 kHz, respectively. These signals are the same as those provided by counter 342 and their period of generation is limited to the period of transmission burst transfer starting from the time of timing signal $T_{11}$. Timing signals $T_{32}$ and $T_{42}$, having frequencies of e.g., 256 kHz and 512 kHz, respectively, are also generated. Their periods of generation are limited to the period of a reception burst transfer starting from the time of the frame signal detected by frame detecting circuit 345. In this manner, timing signals needed to operate line card 3 are generated.

In this embodiment, of the present invention a message to be communicated to one of the telephone terminals shown coupled to exchange 1 in FIG. 1 may be divided into two parts, a fixed part and a changeable part. The changeable part of the message is optional and is not necessary for all messages. The changeable part may be the time of day, date or other such variable information. The fixed part of the message serves as a "template" for the changeable part and is identified by a message identifier code. One of the characteristic features of this embodiment of the present invention is that message communication is conducted by way of message identifier codes.

An example of the correspondence between message identifier codes and respective fixed parts of messages is shown in Table 1 below:

TABLE 1

| Code Identifier | Fixed Part |
|---|---|
| 1 | Have gone directly home. |
| 2 | Will be back by __:__. |
| 3 | Away on vacation. |
| 4 | On business trip; will return on ____. |
| 5 | At meeting till __:__. |
| 6 | This is secretary. Vistor has arrived. |
| : | : |
| n | Call me at telephone No. ____. |

In table 1, the underlined portion adjacent the fixed part represents where the changeable part of those messages which include a changeable part will be inserted.

A correspondence table similar to Table 1 above is stored in each telephone terminal.

The table may be stored in either ROM or RAM within the telephone terminal. Where ROM is used to store the table, it is necessary that the ROM be programmed with the table before hand. Where RAM is used, however, the table may be down loaded from exchange 1 shown in FIG. 1. Thus, exchange 1 must be provided with the proper table for each of the telephone terminals serviced by the exchange. Such tables may be stored in memory 12 connected to CPU 10 or on F.D. 11 also connected to CPU 10 as shown in FIG. 1. Each telephone terminal may also have a custom table to suit the needs of a particular user.

In this embodiment of the present invention, the message communication between telephone terminals may be achieved in two different ways, a preset message way or mode and a real time message or mode.

The preset message mode is used when the telephone user is going to be away from his phone and cannot respond to incoming calls. The user presets a message so that the message is automatically transmitted to the calling party when an incoming call is received from another telephone. The real time message mode is used when the telephone user is presently using his telephone and cannot receive another incoming call. In this mode, a real time message is automatically transmitted to the telephone user for visual display on his telephone.

With reference to the flow charts shown in FIGS. 10a through 13b, the transfer of a message from one telephone terminal to another will be described. In the flow charts, any sequence of steps which are not relevent to the invention are expressed as "designated process" and will not be described in detail.

In the preset message mode, a message may be preset by the telephone user pressing one of the soft keys 242A-242G, on the telephone, e.g., soft key 242G. It is assumed the CPU 251 within the telephone has assigned soft key 242G the function of a message setting/selecting key. When key 242G is pressed, CPU 251 detects that it has been activated and sets the operating mode of the telephone to the preset message mode (Steps 1, 2, 4, 8). In ths mode, CPU 251 reads the contents of the first entry in the identifier code correspondence table and displays it on LCD 241 (Steps 13-16). If the information in the correspondence table is the same as that shown in Table 1 above, the message "Have gone directly home." will be displayed. If this is not the message the user desires, the user pushes message setting/selecting soft key 242G again so that the contents of the second entry in the correspondence table is displayed. This sequence of steps is repeated until the desired message is displayed, e.g., entry 5 in the table, i.e., "At meeting until ___:___." The operator then depresses a confirmation key (Step 21). In this embodiment, the "#" key in dial pad 245 may be used as the confirmation key. However, one of the function keys or one of the other soft keys may also be used as the confirmation key. The identififer code assigned to the selected message, i.e., 5, is then stored (Step 25). Setting of the fixed part of a preset message is thus completed. CPU 251 then determines whether the selected message has a changeable part (Step 26). If it does then the changeable part of the message is entered by the telephone user. Since the selected message has a changeable part, i.e., a time of day such as "03:00", the changeable part is entered by pressing the keys "0", "3", "0", "0" on dial pad 102 in the mentioned order (Steps 2, 3, 17, 18, 21, 22, 23, 24, 20). CPU 251 displays this input at 03:00 in the underlined portion of the message displayed on LCD 241. Thus, a message "At meeting till 03:00" is displayed. Then CPU 251 stores this message in RAM 253 as "50300" where 5 is identifier code "5" and 0300 is the time (Step 23). The information is then sent to exchange 1 (Steps 24, 27, 28, 20) where it is stored. Transmission of the message data from the telephone to exchange 1 is conducted in the same manner as transmission of control signals from the telephone exchange 1. Since the present invention employs the burst transfer method of transferring data, data bits in the format shown in FIG. 3 are used. Thus, a unit of data is compressed of 12 bits.

CPU 251 then sends a "start of preset message" command to exchange 1. FIG. 14 shows an example of such a command which comprises 12 bits: a bit Co the number for frame synchronization, bits C1, C2 which defines the type of command, bits C3-C10 for the data to be transmitted, and a bit C11 for the parity check. The 12-bit command is transmitted from CPU 251 to 12-bit shift register 228 (see FIG. 6) and is provided to exchange 1 in accordance with the process explained above. After CPU 251 sends the "start of present message" command, it then sends the identifier code which identifies the selected message, data for the changeable part of the message if required, i.e., time of day etc., and an "end of preset message" command as also shown in FIG. 14.

Exchange 1 receives the above commands and data way of line card 3 which provides it to CPU 10. Upon receipt and confirmation of the "start of preset message" command (Steps 1-3, 10-12, 9 in the flow chart shown in FIG. 11), CPU 10 recognizes the temporarily stores the identifier code (Steps 1-4, 6, 9) and the changeable data (Steps 1-5, 7, 22, 9). CPU 10 stores information in a message registration portion of memory 12 upon receipt and confirmation of the "end preset message" command (Steps 1-3, 10, 11, 13, 15, 9). The information is stored in a manner which corresponds to the port on line card 3 through which the information was received, i.e., the port assigned to the telephone which generated and transmitted the information.

Figures 15, 17:
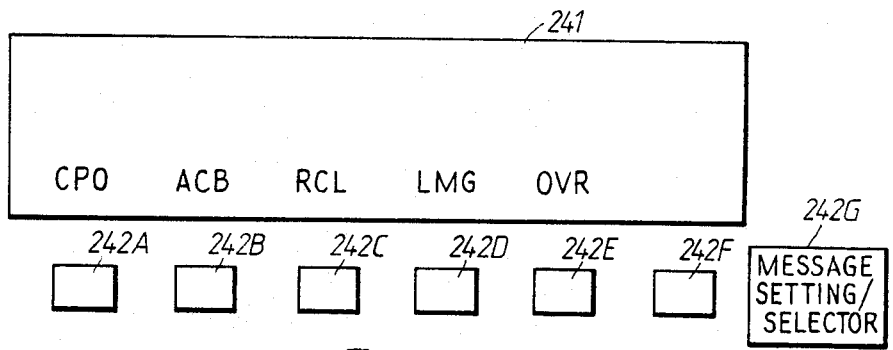
FIG. 15 is an illustration of customer data and telephone message related data which corresponds to respective ports of telephone exchange 1 shown in FIG. 1.
FIG. 17 is an example of the display of the functions assigned to the soft keys in the telephone terminal shown in FIG. 6.
Figure 16:
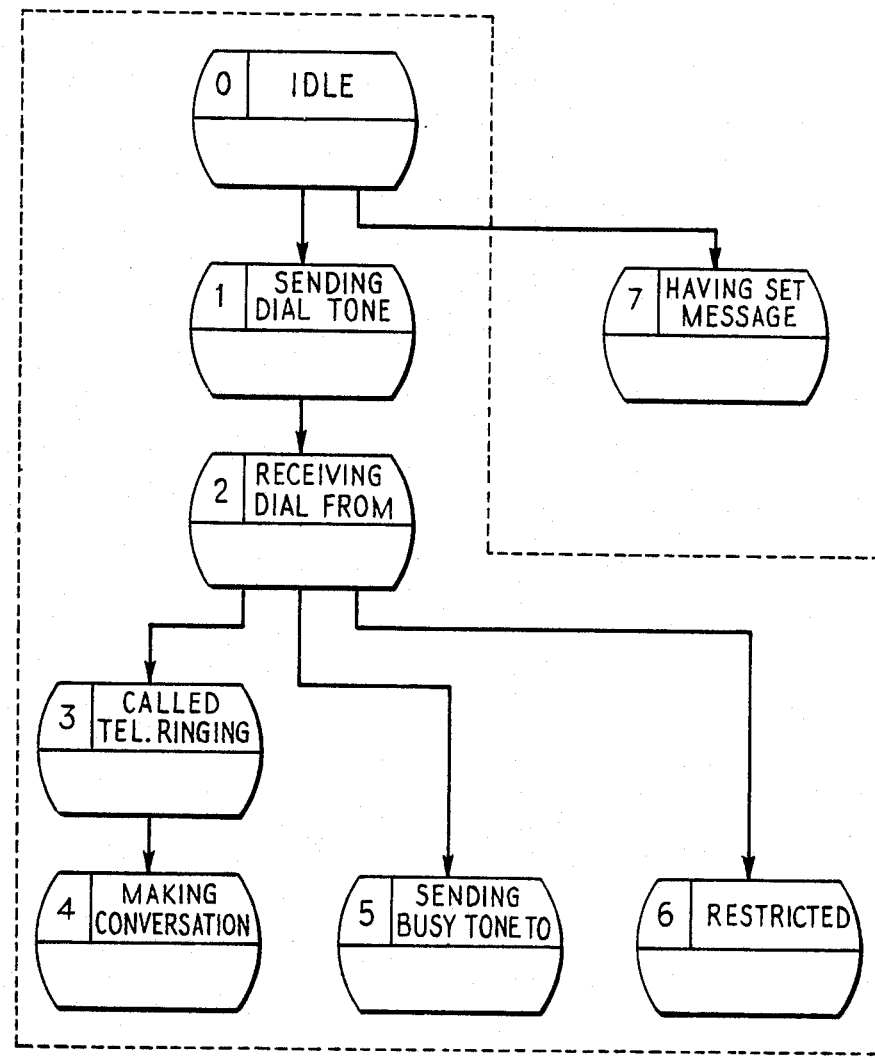
FIG. 16 is another illustration of the operation of the telephone terminal shown in FIG. 1.
Figure 19:
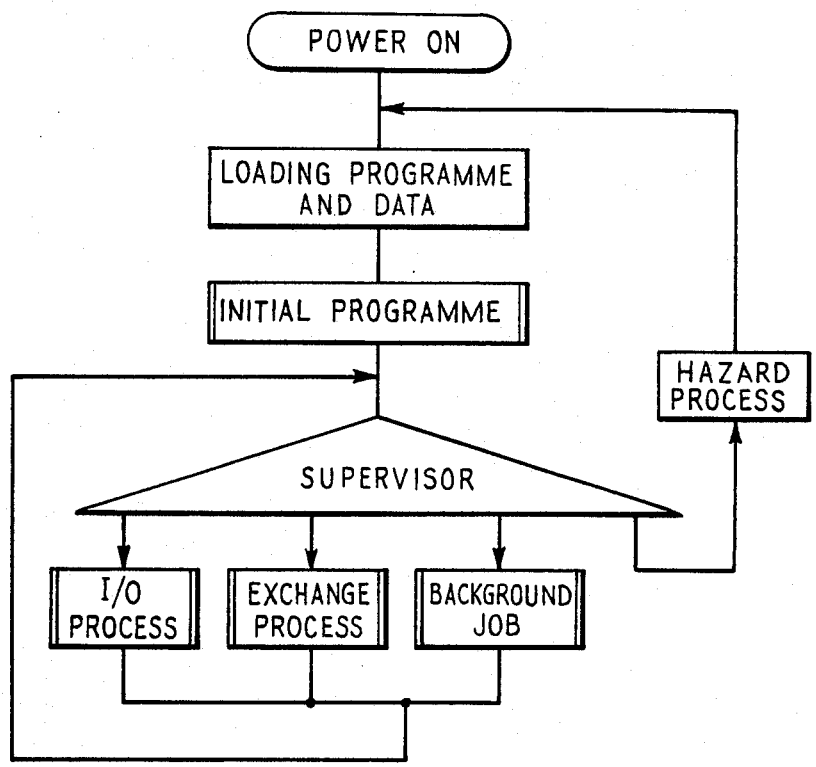
FIG. 19 is a flow chart illustrating the operation of CPU 10 for controlling the telephone exchange shown in FIG. 1.

The construction of the data registration portion of memory 12 will be explained with reference to FIG. 15 where "Port No." refers to various ports on line card 3. The customer data includes such information as the type of telephone serviced by the respective port, the operating state of the telephone, telephone number and the function key assignment. Types of telephones may include, for example, a rotary dial type phone, a touch-tone telephone, a telepone with a visual display, a data terminal telephone, e.g., a computer phone, and so forth. The various operating states of the telephone may include those states set forth in Table 2 below:

TABLE 2

Figure 12:
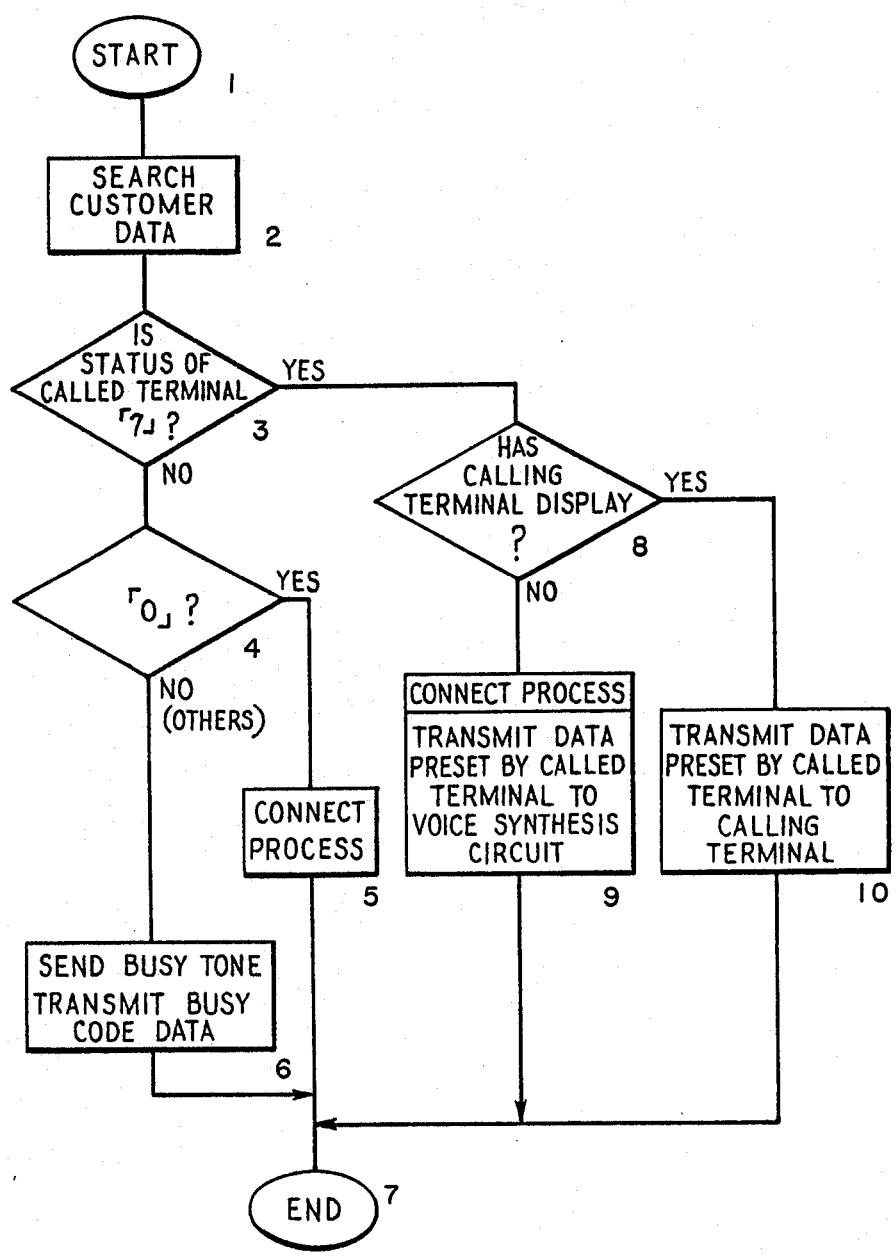
FIG. 12 is a flow chart illustrating the operation of CPU 10 in the telephone message communication system shown in FIG. 1 when an address signal designating a called party is received.

0 - telephone idle
1 - sending dial tone
2 - dialing telephone No.
3 - telephone ringing
4 - busy - talking on phone
5 - sending busy tone
6 - restricted
7 - message set With reference again to FIG. 1, it is assumed that telephone terminal 2(A) from which message data has been transmitted to exchange 1 as above described is called by another telephone terminal 2(B). In response to the call from telephone terminal 2(B), CPU 10 in exchange 1 begins to process the call. After receipt of the telephone number for called telephone 2(A) from calling telephone 2(B), the process shown by the flow chart in FIG. 12 is performed. CPU 10 examines the customer data stored in the above-described data registration portion of memory 12 for the called telephone number to determine the operating state of the called telephone 2(A) (Steps 1, 2). CPU 10 then controls the exchange 1 to connect telephone 2(A) to telephone 2(B) if the operating state is "0", i.e., telephone 2(A) is in an idle state. If, however, the operating state of telephone 2(A) is "7", CPU 10 recognizes that message related data has been preset (Step 3). CPU 10 then reads the message related data, i.e., "50300" and then sends it to telephone 2(B) if telephone 2(B) has a display (Steps 8, 10, 2). The message related data is transmitted to telephone 2(B) in the same manner as the origin message data was transmitted to exchange 1 from telephone 2(A). CPU 10 in exchange 1, therefore, transmits the message related data to calling terminal 2(B) through line card 3 in accordance with the format shown in FIG. 14. The transmission between line card 3 and telephone terminal 2(B) is achieved by the burst transfer method described above.

Figure 13:
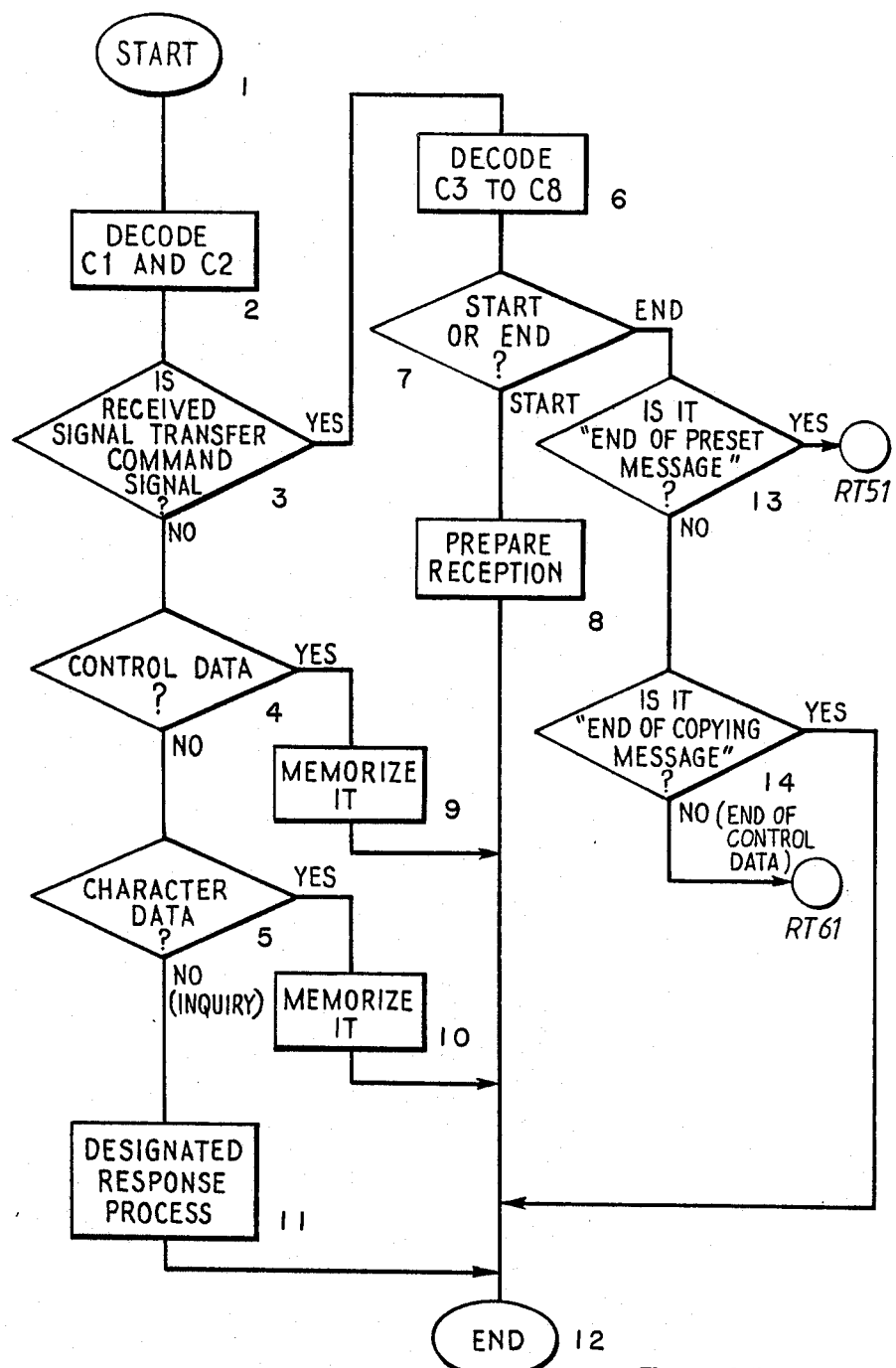
FIGS. 13a and 13b are flow charts illustrating the operation of CPU 251 in the telephone terminal shown in FIG. 6 when an incoming signal is received.
Figure 13B:
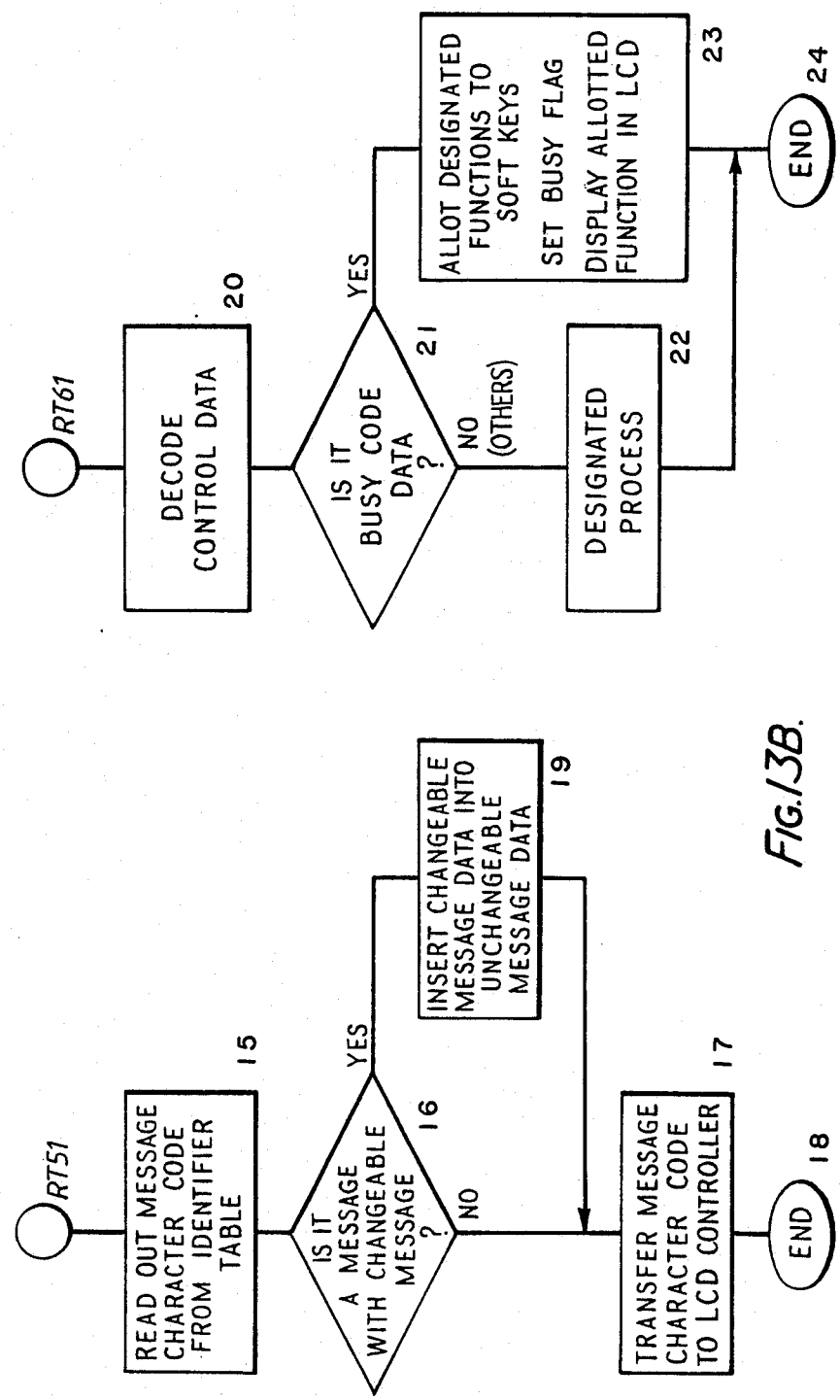

Upon receipt of the "start of preset message" command from exchange 1, CPU 251 executes the process shown by the flow charts in FIG. 13a and 13b to receive and store the identifier code, the changeable part of the message and the "end of present message" command. CPU 251 then matches the identifier code with the proper message stored in the message correspondence table within the telephone, i.e., "At meeting till ___:___." The changeable part of the message is inserted in its correct place and the complete message is displayed on LCD 241. Thus the message "At meeting till 03:00" is displayed on telephone 2(B) to is user.

The real time mode of the telephone is used when the caller wishes to urgently communicate with another telephone when that telephone is busy, e.g., when a secretary wishes to inform her boss of the arrival of a client while the boss is talking on his telephone.

When a called telephone is busy, exchange 1 transmit a busy tone from tone circuit 6 and control data representing a busy state to the calling terminal (Steps 1, 2, 3, 4, 6, 7, in the flow chart of FIG. 12). Upon receipt of the busy control data, CPU 251 in the calling telephone assigns the functions of camp-on, auto call back, auto-recall, message transfer and interrupt to soft keys 242A-242F (Step 1, 2, 3, 6, 7, 8, 12, Steps 1, 2, 3, 4, 9, 12 and Steps 1, 2, 3, 6, 7, 13, 14, 20, 21, 23, 24, in the flow chart of FIGS. 13a and 13b). At the same time, CPO (camp-on), ACB (auto call back), RCL (recall), LMG (message transfer) and interrupt are displayed in respective portions of LCD 241 corresponding to the functions assigned to soft keys 242A-242F.

The telephone user then presets soft key 242D which, as indicated above, is not a message transfer key. When this key is pressed, the user formulates a message for transmission to the called telephone. The message is formulated in the same manner as when the telephone is in the preset message mode described above. The message identifier code and changeable part, if present, is then sent to exchange 1 as also described above. As shown in FIG. 18, this message related data includes a "start of real time" command, the message identifier code and an "end of real time message" command. If the message includes a changeable part, the message related data would also include the changeable data as shown in FIG. 14.

Upon receipt and confirmation of the message related data, CPU 10 within exchange 1 retransmits the message related data in the format shown in FIG. 18 to the called telephone regardless of the operating side of the telephone. Thus, even when the called telephone is busy, a message can be communicated to the called telephone.

In a further embodiment of the present invention, correspondence between the message identifier codes and the messages is provided from data terminal 14 to floppy disk 11 in exchange 1. In addition, the correspondence between the identifier codes and the message is not stored in the telephone terminals before hand.

Data terminal 14 is a general data input terminal which serves a number of functions including performing system maintenance and testing, formulation of preset and real time messages, creation of message correspondence tables for transmission to telephone terminals, up-dating telephone customer data, etc. Each function performed by data terminal 14 is assigned an authorization code. For example, an authorization code of "0001" may be assigned to the function of entering message identifier code and a changeable part of a message. Authorization code "0002" may be assigned to the function of entering message correspondence tables for storage in exchange 1 and subsequent transmission to the various telephones connected to the exchange. Thus, in this embodiment of the invention, individual telephones need not have means for entering such data and transmitting it to exchange 1.

In exchange 1, all of the information entered from data terminal 14 may be stored on F.D. 11. Thus, when exchange 1 is first activated, this information may be read from F.D. 11 and stored in memory 12. Such information would also include the customer related data shown in FIG. 15 and the set up of a message registration portion within memory 12 as above described. In addition, the message correspondence table for each telephone connected to the exchange is automatically transmitted to the telephone and stored in the RAM memory 253. The transfer of such information is achieved in the same manner described above with respect to control data being transmitted from exchange 1 to the various telephones.

FIG. 20 shows the data format used in this embodiment of the invention. CPU 10 in exchange 1 issues a 12-bit "start of copying message" command. This command is received by CPU 321 in line card 3 and is stored in register 317. Thereafter, the command is transferred to telephone terminal 2 using the burst transfer method described above. In the telephone, CPU 251 receives the command through receiving frame register 226 and 12-bit shift register 227. The "start of copying message", No. of message identifier and the message itself (the unchangeable part) are successively sent to the telephone. CPU 251 receives this information and stores the identifier code and changeable part in RAM 253 (See the flowchart in FIG. 13a). This process is terminated upon receipt of an "end of copying message" command.

This transfer of data from exchange 1 to each telephone, i.e., a loading map, is accomplished during the time that the telephone is in an idle state as shown in Table 2. The same data may also be sent to each telephone from exchange 1 or may be different depending on the needs and requirement of each individual telephone user.

Figure 21:
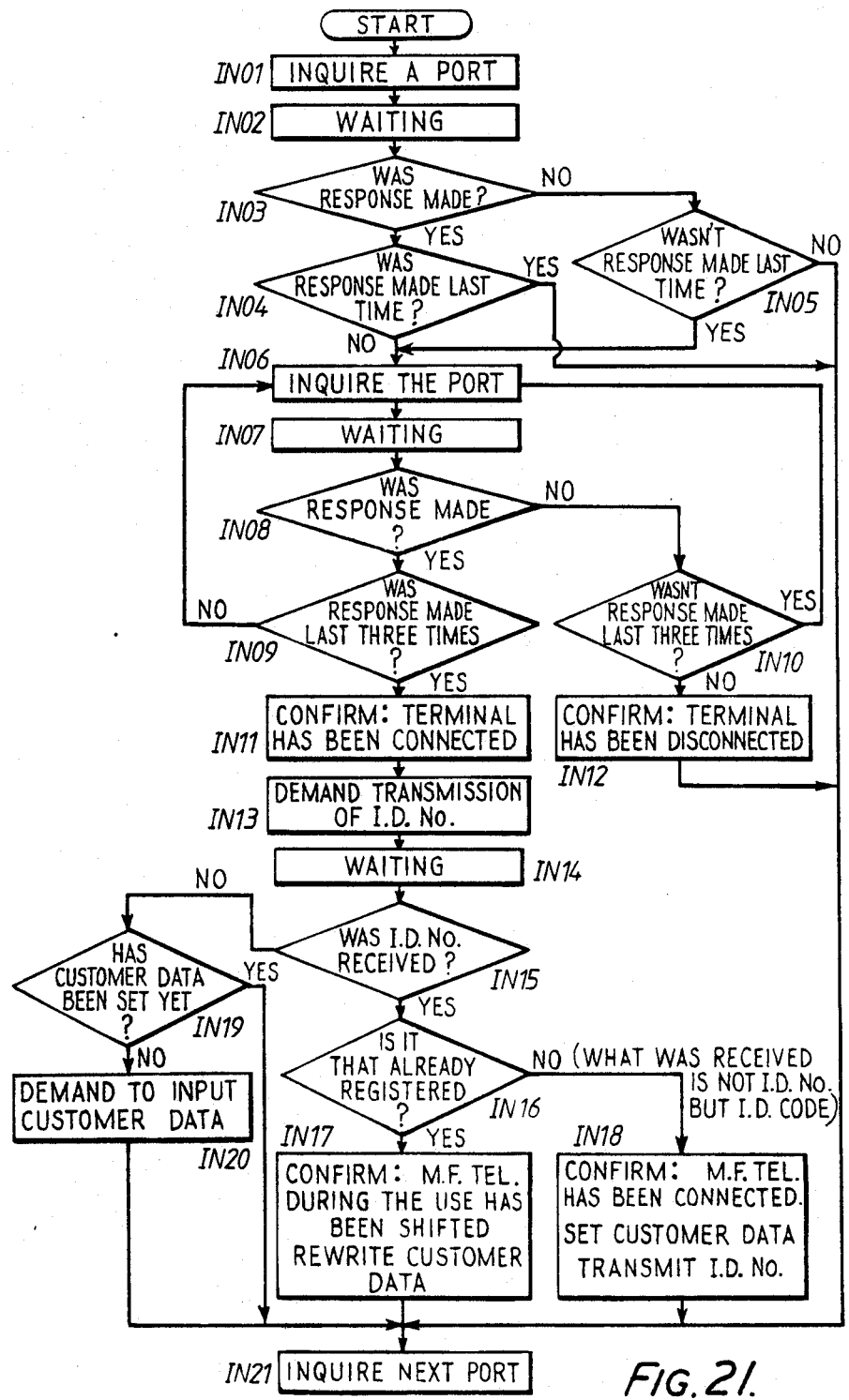
FIG. 21 is a flow chart illustrating the operation of CPU 10 of the exchange shown in FIG. 1 when checking the status of the various telephone terminals connected to the exchange and updating telephone user related information.
Figures 22, 23:
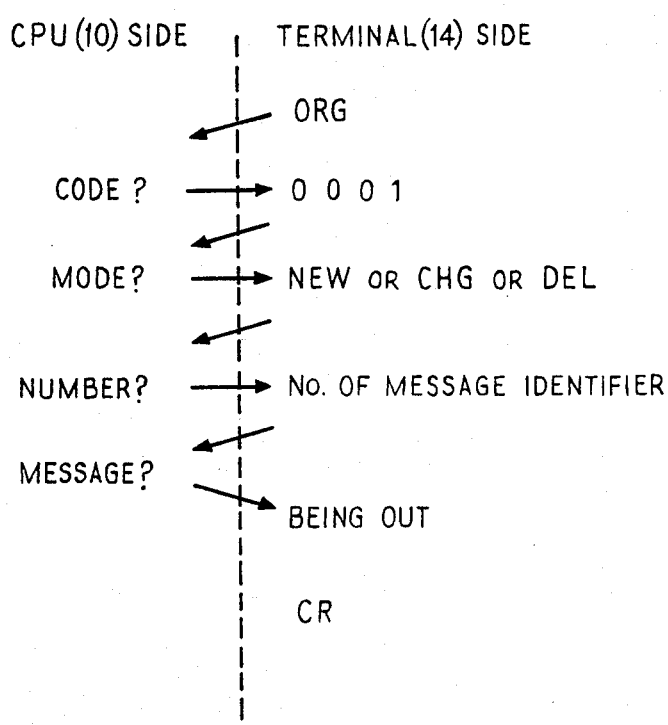
FIG. 22 is an illustration of the format of control signals used during formation of a telephone load map.
FIG. 23 is an illustration of the procedure used for inputting a message from the data terminal shown in FIG. 1 in accordance with the present invention.

Exchange 1 communicates with each telephone through a respective port in line card 3. CPU 10 must, therefore, poll each port to determine if a telephone is connected to the port. This procedure is illustrated by the flow chart shown in FIG. 21 and involves CPU 10 sending the inquiry signal shown in FIG. 22 to each port and looking for a response signal also shown in FIG. 22. The response signal also includes identification data indicating the type of telephone connected to the port, i.e., multi-function telephone, rotary dial, touch-tone, telephone with display, telephone without display, etc. Since CPU 10 regularly polls each port of line card 3 to determine which ports have telephones and the type of telephone connected to each port, exchange 1 always remains current with repsect to the services it can provide to the telephone user. Moreover, a telephone of of one type can be connected to a different port without the need to manually notify CPU 10 of that fact. CPU 10 automatically provides the requisite services to each telephone.

Figure 24:
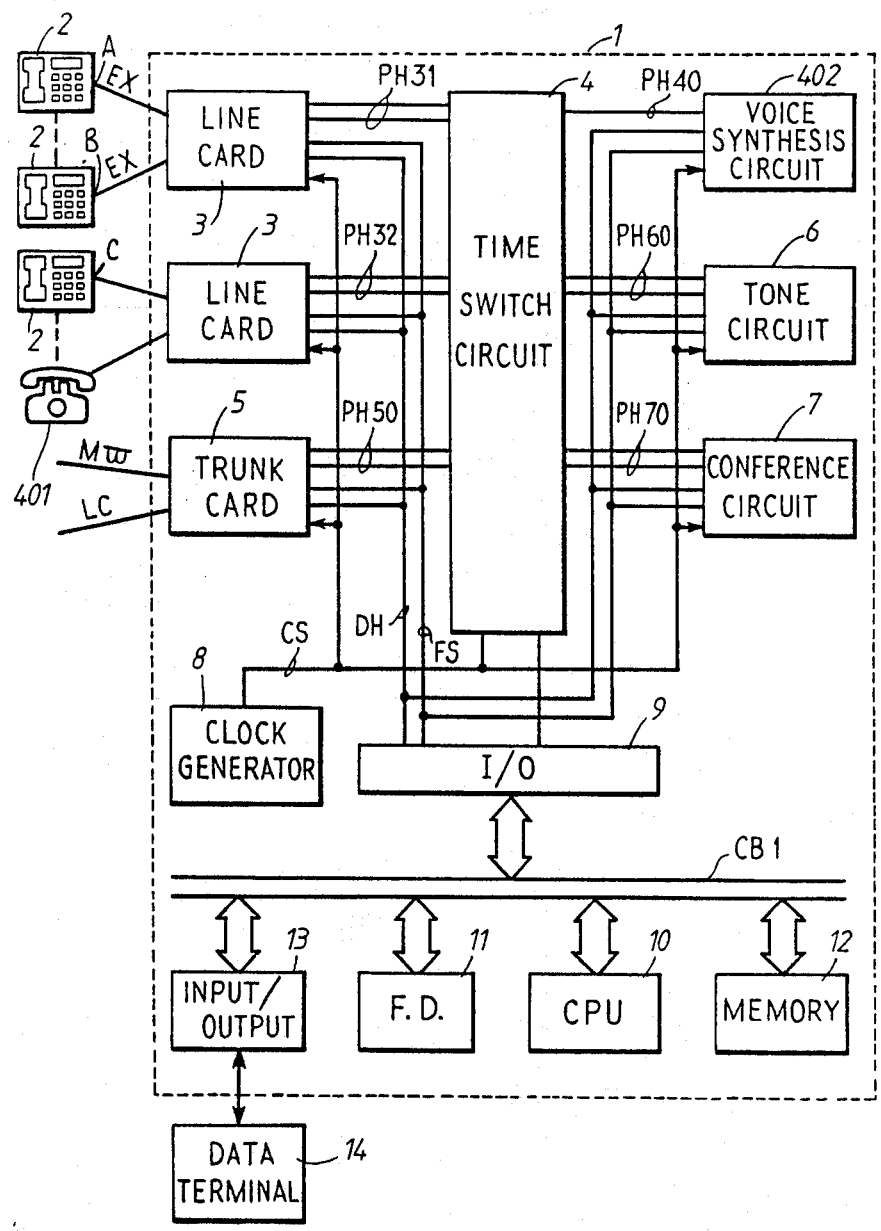
FIG. 24 is a block diagram of a telephone message communication system in accordance with another embodiment of the present invention.
Figure 25:
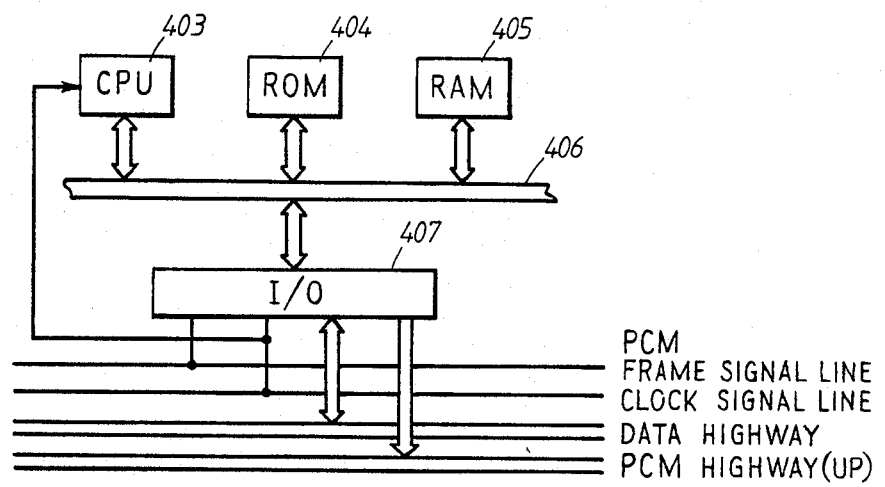
FIG. 25 illustrates the construction of voice synthesis circuit 402 shown in FIG. 24.

With reference to FIG. 24, the present invention will be described with respect to a telephone which has no display, i.e., a standard telephone 401 is connected to exchange 1 of this embodiment as shown in FIG. 24. In this case, it is assumed that the message has been converted into a voice signal by voice synthesis circuit 402 and is then transferred to standard telephone 401.

Figure 5:
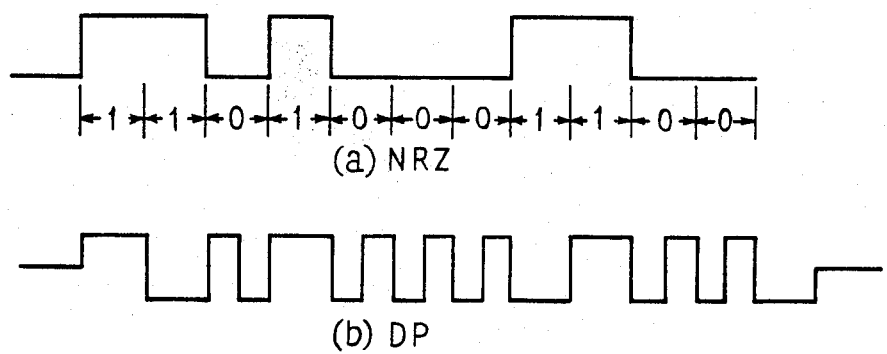
FIG. 5 is an illustration of an NRZ signal and a DP signal train.

As shown in FIG. 5, voice synthesis circuit 402 comprises CPU 403, ROM 404, RAM 405, buss 406 and I/O 407. CPU 603 operates in accordance with a program stored in ROM 404. ROM 404 stores a word dictionary for the voice synthesis, as well as the correspondence between the message identifier codes and the messages. When a message transfer is made by means of exchange 1, the state of the called terminal can be determined from the customer data as explained above. If the called terminal is a standard telephone, CPU 10 of exchange 1 transmits the message identifier code and changeable data to the voice synthesis circuit 402 and then to the caller's telephone.

CPU 403 receives the message identifier through I/O 407 and common buss 406 and commences the voice synthesis process. If, for example, "50300" is transmitted to the CPU 403 as the message identifier and the changeable part of a message, CPU 403 reads the message corresponding to the message identifier "5" from ROM 404. Thus, the message "At meeting till 03:00." is synthesized in to a voice signal.

Figure 26:
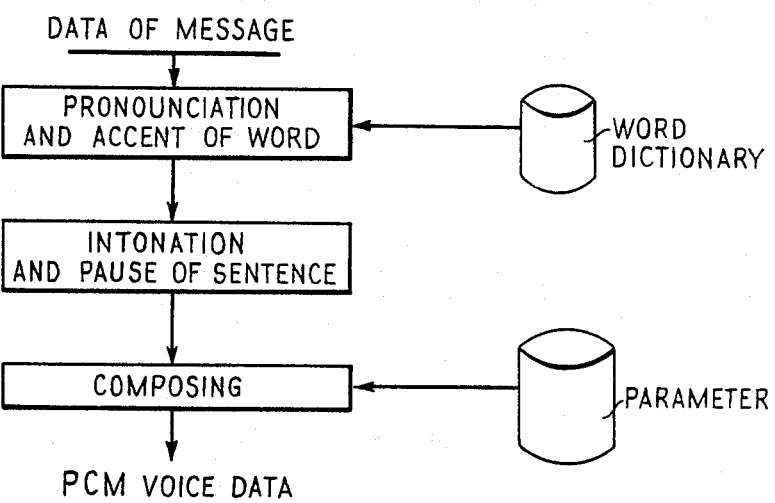
FIG. 26 illustrates the process used by voice synthesis circuit 402 shown in FIG. 24 to obtain PCM voice data from message data.

FIG. 26 is a flow chart showing the operation of the voice synthesizing process. With reference to the word dictionary, pronunciation and accent are provided for each word of the message. Then, intonation and pause are provided thus converting the message into speech.

Subsequently, regular voice synthesis is conducted on the basis of the voice parameters, and a PCM voice signal is obtained. This signal is transmitted to line card 15 through PCM buss PH40 and time switch circuit 4. The PCM signal is converted into an analog voice signal in the line card and is sent to standard telephone 321 for reproduction. The message may be repeated a number of times, e.g., until the handset is put down.

Many changes to the present invention may be made by those skilled in the art. For instance, the main memory of exchange 1 may be divided into sections and distributed to the line card and trunk cards so that the message is stored in the memories of these cards. In addition, the methods used to transfer data between the exchange and the telephone terminal need not always be limited to those described before. Other types of displays such as CRT, LED and LCD can be used for the telephone terminal and the key arrangement and operation may be different from those used in the described embodiments.

We claim:

1. A telephone communication system having an exchange and a plurality of telephones connected to said exchange, wherein said exchange automatically connects a first telephone to a second telephone when said first telephone is being called by said second telephone and said first telephone responds to the call, a method of automatically providing stored information to the user of said second telephone, said method comprising the steps of:

storing information in said second telephone;
transmitting from a first telephone to said exchange an information identifier wherein said information identifier is capable of identifying information stored in said second telephone;
associating said information identifier with said first telephone;
storing in said exchange said information identifier and its association with said first telephone;
controlling said exchange to transmit said information identifier to said second telephone when said second telephone calls said first telephone; and
providing said stored information to a user of said second telephone when said information identifier is received by said second telephone.

2. The method of claim 1 wherein:

said step of storing information in said second telephone includes the step of storing a plurality of messages for the user of said second telephone;
said step of storing said information identifier in said exchange includes the step of storing at least one message identifier identifying a respective message in said second telephone; and
said step of providing said stored information to said user includes the step of providing to said user the message identified by said message identifier.

3. The method of claim 1 wherein said step of storing information in said second telephone includes the steps of previously storing said information in said exchange and transmitting said information to said second telephone from said exchange.

4. The method of claim 1 further including the step of providing a display on said second telephone for display of said stored information in response to the receipt of said message identifier.

5. The method of claim 1 wherein:

said step of storing information in said second telephone includes the step of storing at least one message having a fixed part and an undetermined changeable part;
said step of transmitting from said first telephone includes the step of transmitting to said exchange said changeable part;
said step of storing in said exchange includes the step of storing said changeable part in said exchange;
said step of controlling said exchange includes the step of transmitting said changeable part to said second telephone when said second telephone calls said first telephone; and said step of providing said stored information includes the step of providing said message to the user of said second telephone when said information identifier is received by said second telephone, wherein said changeable part is provided along with said fixed part of said message.

6. A telephone communication system having an exchange and a plurality of telephones connected to said exchange, wherein said exchange automatically connects a called telephone to a calling telephone when said called telephone is being called by said calling telephone, a method of automatically providing stored information to a user of said calling telephone, said method comprising the steps of:

storing information in said calling telephone;
providing said exchange with an information identifier identifying the information stored in said calling telephone;
providing said exchange with data associating said information identifier with said called telephone;
storing in said exchange said information identifier and its association with said called telephone;
controlling said exchange to transmit said information identifier to said calling telephone when said calling telephone calls said called telephone; and
providing said stored information to the user of said calling telephone when said information identifier is received by said calling telephone.

7. The method of claim 6 wherein said step of:
storing information in said calling telephone includes the step of storing a plurality of messages for the user of said calling telephone; and
said step of providing said exchange with an information identifier includes the step of providing at least one message identifier identifying a respective message in said calling telephone.

8. The method of claim 6 wherein said step of storing information in said calling telephone includes the step of transmitting previously stored information to said calling telephone from said exchange.

9. The method of claim 6 further including the step providing a display on said calling telephone for display of said stored information.

10. The method of claim 6 wherein:
said step of storing information in said calling telephone includes the step of storing at least one message capable of having a fixed part and a changeable part;
said step of providing said exchange with an information identifier includes providing said exchange with data indicative of a changeable part;
said step of storing in said exchange includes the step of storing said changeable part in said exchange;
said step of controlling said exchange includes the step of transmitting said changeable part to said calling telephone when said calling telephone calls said called telephone; and
said step of providing said stored information to the user includes the step of providing said message to the user of said calling telephone when said information identifier is received by said calling telephone, wherein said changeable part is provided along with said fixed part of said message.

11. A message communication method for use in an electronic switching system having an exchange and a plurality of telephone terminals connected to said exchange, said method comprising the steps of:

presetting at least one message in at least one of said telephone terminals to be called and transmitting data including a message identifier corresponding to said preset message to said exchange;
receiving said data in said exchange and storing said message identifier in relation to the telephone terminal from which said data was transmitted;
determining the operating status of a called telephone terminal;
transmitting said data to a calling telephone terminal when said called terminal has a preset message;
receiving said data transmitted from said exchange in said calling telephone terminal;
searching for a message corresponding to said message identifier in said calling terminal and displaying the contents of said searched message at said calling terminal.

12. A message communication method according to claim 11 further comprising the step of transmitting a plurality of message identifications and respective messages from said exchange to said telephone terminals connected to said exchange prior to preset of at least one message in at least one of said telephone terminals to be called.

13. A message communication method according to claim 11 wherein said step of determining the operating status of a called telephone includes the step of recognizing whether a calling telephone terminal has a display and transmitting a voice signal corresponding to a message when said calling telephone terminal does not have a display.

14. A message communication method according to claim 11 wherein at least one of said message includes a changeable portion and said message identifier corresponding to said changeable portion, said data including said changeable portion.

15. A message communication method for use in an electronic switching system, having an exchange and a plurality of telephone terminals connected to said exchange, said method comprising the steps of:

setting at least one message identifier and respective message in one or more of said telephone terminals;
transmitting data including a message identifier corresponding to said set message from a calling telephone terminal to said exchange;
receiving said data in said exchange and transmitting said received data to particular telephone terminals when a called terminal is busy;
receiving said data transmitted from said exchange in said particular telephone terminals; and
displaying in said particular telephone terminals the contents of said set message in response to said message identifier included in said received data.

16. A message communication method according to claim 15 further comprising the step of transmitting a plurality of message identifiers and respective messages from said exchange to said telephone terminals for storage thereof in said telephone terminals.

17. A message communication method according to claim 15 wherein at least one of said messages comprises a fixed part and a changeable part, said message identifier corresponding to said fixed part and said data including said changeable part.

18. A message communication system in an electronic switching system having an exchange and a plurality of telephone terminals connected to said exchange, comprising:

first storage means in said telephone terminals for storing a plurality of message identifiers and respective messages;

presetting means in said telephone terminals, for presetting at least one of said messages;

first transceiver means provided in said telephone terminals, for transmitting to said exchange and receiving therefrom data including message identifiers;

display means provided in said telephone terminals for displaying the contents of a message;

first control means operatingly connected to said first storage means, said presetting means, said first transceiver means and said display means for controlling said first transceiver means to transmit said data when a message is present in said presetting means, and searching said first storage means to find the message corresponding to a message identifier when transmitted from said exchange and received by said first transceiver means, and controlling said display means to display the contents of at least said searched message;

second storage means provided in said exchange for storing status information associated with said telephone terminals;

second transceiver means provided in said exchange for transmitting to said telephone terminals and receiving therefrom said data;

second control means, operatingly connected to said second storage means and said second transceiver means, for storing message identifiers with said status information in said second storing means when received by said second transceiver means and controlling said second transceiver means to transmit said data to a calling telephone terminal when the telephone terminal having a preset message is called.

19. A message communication system according to claim 18 further comprising memory means provided in said exchange for storing a plurality of message identifier and respective messages, wherein said second control means further controlling said second transceiver means to transmit said plurality of message identifiers and respective messages to all of said telephone terminals provided with said first memory means for reception thereof.

20. A message communication system according to claim 18 further comprising voice synthesizing means for generating voice signal corresponding to a message, said second control means includes recognizing means for recognizing whether a calling telephone terminal has a display, said second control means further controlling said synthesizing means to generate said voice signal when said calling telephone terminal does not have a display.

21. A message communication system according to claim 18 wherein at least one of said messages includes a changeable portion and an unchangeable portion, said message identifier corresponding to said unchangeable portion and said data including said changeable portion.

22. A message communication system in an electronic switching system having an exchange and a plurality of telephone terminals connected to said exchange, said message communication system comprising:

first storage means in said telephone terminals for storing a plurality of message identifiers and messages;

setting means in said telephone terminal for setting at least one message;

first transceiver means provided in said telephone terminals for transmitting to said exchange and receiving therefrom data including said set message;

display means provided in said telephone terminals for displaying the contents of said set message;

first control means for operatingly connected to said first storage means, said setting means, said first transceiver means and said display means for controlling said transceiver means to transmit said data when a message is set in said setting means, and searching said first storage means to find the message corresponding to a message identifier when transmitted from said exchange and received by said first transceiver means, and controlling said display means to display the contents of a set message;

second transceiver means provided in said exchange for transmitting to a telephone terminal and receiving therefrom said data;

second control means operatingly connected to said second transceiver means for controlling said second transceiver means to transmit said data transmitted from a calling telephone terminal to a called telephone terminal when said called telephone terminal is busy.

23. A message communication system according to claim 22 further comprising memory means provided in said exchange for storing a plurality of message identifiers and respective messages, wherein said second control means further controlling said second transceiver means to transmit said plurality of message identifiers and respective messages to all telephone terminals provided with said first memory means for reception thereof.

24. A message communication system according to claim 22 wherein, at least one of said messages includes a changeable portion and a unchangeable portion, said message identifier corresponding to said unchangeable portion and said data including said changeable portion.

25. A message communication method for use in an electronic switching system having an exchange and a plurality of telephone terminals connected to said exchange, said method comprising the steps of:

storing a plurality of message identifiers and respective messages in said telephone terminals;

setting a message in a calling telephone terminal when the then called telephone terminal is busy;

transmitting data including a message identifier corresponding to said set message from said calling telephone terminal to said exchange;

receiving said data in said exchange and transmitting said received data to said busy called telephone terminal;

receiving said data transmitted from said exchange in said busy called telephone terminal; and displaying in said busy called telephone terminal the contents of one of said stored messages in response to said message identifier included in said received data.

26. A message communication method according to claim 25 further comprising the step of transmitting a plurality of message identifiers and respective messages from said exchange to said telephone terminals for storage thereof in said telephone terminals.

27. A message communication method according to claim 25 wherein at least one of said messages comprises a fixed part and a changeable part, said message identifier corresponding to said fixed part and said data including said changeable part.

* * * * *